(12) United States Patent
Watanabe et al.

(10) Patent No.: US 6,729,997 B2
(45) Date of Patent: May 4, 2004

(54) TOROIDAL CONTINUOUSLY VARIABLE TRANSMISSION

(75) Inventors: Jun Watanabe, Yokohama (JP); Toshikazu Oshidari, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/152,974

(22) Filed: May 23, 2002

(65) Prior Publication Data

US 2002/0198077 A1 Dec. 26, 2002

(30) Foreign Application Priority Data

Jun. 22, 2001 (JP) .......................................... 2001-189506

(51) Int. Cl.$^7$ .............................................. F16H 15/38
(52) U.S. Cl. .......................................... 476/42; 476/40
(58) Field of Search ....................................... 476/40, 42

(56) References Cited

U.S. PATENT DOCUMENTS

| 5,893,815 A | 4/1999 | Nakano |
| 5,951,435 A | * 9/1999 | Imanishi et al. ............... 476/46 |
| 6,527,666 B1 | * 3/2003 | Mori et al. ................... 476/40 |
| 6,659,908 B2 | * 12/2003 | Ishikawa et al. ............... 476/42 |
| 2001/0016534 A1 | 8/2001 | Oshidari |

FOREIGN PATENT DOCUMENTS

| JP | 9-317837 | 12/1997 |
| JP | 2001-182793 | 7/2001 |

* cited by examiner

Primary Examiner—David Fenstermacher
(74) Attorney, Agent, or Firm—Foley & Lardner LLP

(57) ABSTRACT

In a toroidal continuously variable transmission, a link support structure of one of upper and lower links linking ends of trunnions includes a stationary portion fixed to a transmission casing. Also provided is an engagement portion formed at the link and in contact with the stationary portion. The engagement pair restricts a fore-and-aft movement of the link relative to the casing in a direction of a common rotation axis $O_1$ of input and output disks. A freedom for the fore-and-aft movement of the link relative to the casing is relatively less than a freedom for a vertical movement of the link relative to the casing in a direction of the trunnion axis $O_2$ and relatively less than a freedom for a left-and-right movement of the link relative to the casing in a direction normal to both the common rotation axis $O_1$ and the trunnion axis $O_2$.

20 Claims, 10 Drawing Sheets

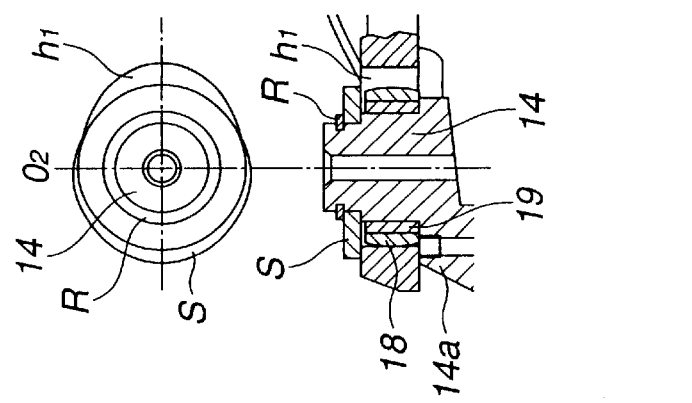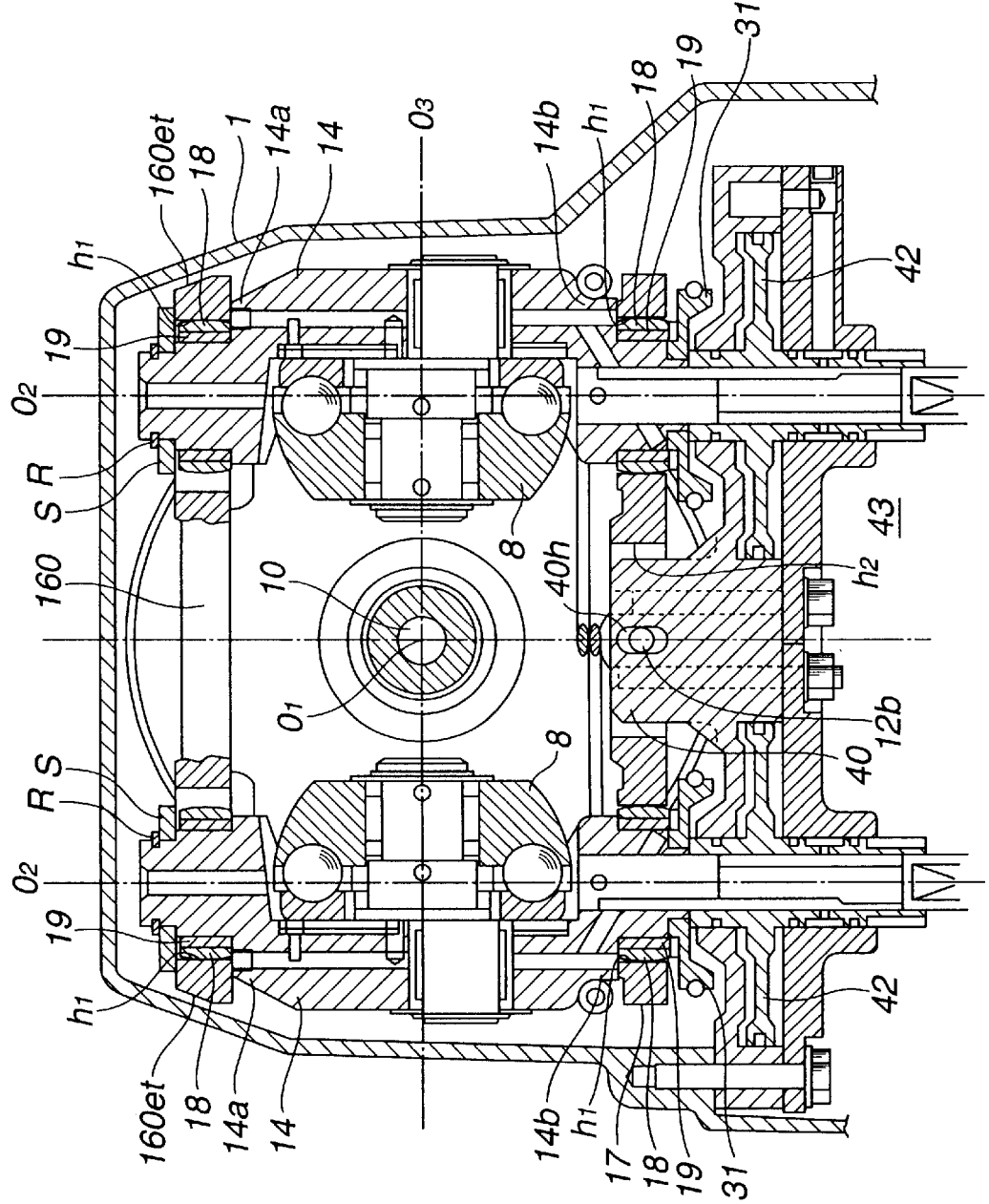

TOROIDAL CONTINUOUSLY VARIABLE TRANSMISSION

TECHNICAL FIELD

The present invention relates to a toroidal continuously variable transmission for a vehicle, and specifically to a link support structure of a toroidal continuously variable transmission.

BACKGROUND ART

To meet demands for increased shift comfort, improved driveability, and reduced fuel consumption and exhaust emissions, there have been proposed and developed toroidal continuously variable transmissions often abbreviated to "toroidal CVTs", in which a transmission ratio is steplessly variable within limits. On such toroidal CVTs, engine power (torque) is transmitted from an input disk to an output disk via a traction oil film formed between a power roller and each of the input and output disks, using a shearing force in the traction oil film at high contact pressure. The input and output disks coaxially oppose each other. Generally, a pair of power rollers are disposed between the input and output disks. One such toroidal CVT has been disclosed in Japanese Patent Provisional Publication Nos. 9-317837 (hereinafter is referred to as JP9-317837 corresponding to U.S. Pat. No. 5,893,815) and JP2001-182793 (corresponding to U.S. Patent Publication No. US2001/0016534 A1). FIG. 8 shows a partial cutaway view of the front side of a so-called double cavity type toroidal CVT (disclosed in JP9-317837 corresponding to U.S. Pat. No. 5,893,815) that a first variator (a front toroidal CVT mechanism) and a second variator (a rear toroidal CVT mechanism) are set in tandem and coaxially arranged in the interior space of a toroidal CVT casing 1. As shown in FIG. 8, the front toroidal CVT mechanism has a pair of trunnions 14, 14 each serving as a power roller support for power roller 8 being in contact with a torus surface of each of the input and output disks under preload (under a loading force). In FIG. 8, the axis denoted by $O_1$ is a common rotation axis of the input and output disks, the axis denoted by $O_2$ is a trunnion axis, and the axis denoted by $O_3$ is a rotation axis of the power roller. Owing to the grip force (the loading force) acting on the power roller, there is a tendency for the power roller to be driven out from between the input and output disks. To avoid this, upper ends of trunnions 14 are mechanically linked to each other by means of an upper link 16, while lower ends of trunnions 14 are mechanically linked to each other by means of a lower link. FIGS. 9 and 10A–10B show a conventional link support structure as disclosed in JP9-317837 (corresponding to U.S. Pat. No. 5,893,815) or U.S. Patent Publication No. US2001/0016534 A1. As clearly shown in FIG. 9, upper link 16 is formed therein with two pairs of trunnion support holes $h_1$, $h_1$, $h_1$, $h_1$, each pair $h_1$, $h_1$ associated with the two trunnions included in one of the first and second variators. A substantially square hole $h_2$ is formed in the upper link and located midway between upper-left and lower-left trunnion support holes $h_1$, $h_1$, supporting the trunnion pair 14, 14 included in the first variator. In the same manner, a substantially square hole $h_2$ is formed in the upper link and located midway between upper-right and lower-right trunnion support holes $h_1$, $h_1$ supporting the trunnion pair 14, 14 included in the second variator. Upper link 16 is pivotally supported by way of a pair of link posts or a pair of link supports 11, 11, passing through the respective square hole $h_2$, $h_2$. In FIG. 9, reference sign $h_3$ denotes a central rectangular hole, which is provided to avoid the interference between the upper link and the output disks of the first-and second variators. Link support 11 is securely connected to toroidal CVT casing 1 by means of a bolt A. Concretely, upper link 16 is pivotally supported by way of two pairs of pins 12a, 12a, 12a, 12a, which are aligned with each other in the direction of common rotation axis $O_1$ of the input and output disks. The lower link support structure is the same as the upper link. FIG. 10A is a side view of the upper link portion, taken in the direction of common rotation axis $O_1$ of the input and output disks. FIG. 10B shows analytical mechanics (vector mechanics) for a force γ applied from the right-hand trunnion to the upper link and a reaction force δ applied from the left-hand trunnion to the upper link and a force ε applied to pin 12a, during transmission-ratio changing. As is generally known, during ratio changing, in order to obtain a desired transmission ratio determined based on the magnitude of a gyration angle of the power roller, each power roller is vertically shifted or displaced from a neutral position (anon-ratio-changing position shown in FIG. 10A) at which power-roller rotation axis $O_3$ intersects the center of rotation (common rotation axis $O_1$) of the input and output disks. The shifting operation of the power roller pair is created by shifting one of the trunnion pair 14, 14 in a first direction α of trunnion axis $O_2$ perpendicular to power-roller rotation axis $O_3$ via a hydraulic servo mechanism with a servo piston, and by shifting the other trunnion in a second direction β opposite to the first direction α via a hydraulic servo mechanism in synchronism with the shifting operation of the one trunnion. That is, the two trunnions are shifted in phase in the opposite trunnion-axis directions α and β during ratio changing. A jointed portion between each of the trunnions and the upper link must be designed to permit the previously-noted vertical displacement or offset of the power roller from the neutral position and a change of the gyration angle of the power roller. Thus, as shown in FIGS. 10A and 10B, the jointed portion is constructed as a combination joint comprised of a bearing B fitted to the upper end portion of trunnion 14 and a spherical joint C fitted onto the bearing B. As best seen in FIG. 9, the conventional link support structure is a pin-support structure composed of pins 12a, 12a, 12a, 12a axially aligned with each other in the direction of common rotation axis $O_1$. In case of such a pin-support structure, pins 12a, 12a, 12a, 12a function to restrict translating motions in three different directions, namely a longitudinal direction along common rotation axis $O_1$ of the input and output disks, a vertical direction along trunnion axis $O_2$, and a lateral direction (a left-and-right direction) normal to both the longitudinal direction along input/output-disk rotation axis $O_1$ and the vertical direction along trunnion axis $O_2$. The conventional pin-support structure has several drawbacks discussed hereunder.

As can be seen in FIG. 10B, during ratio changing that trunnions are shifted in phase in the opposite directions α and β, there is a tendency that trunnion 14 is relatively inclined with respect to upper link 16 with an intersection angle, which is an angle of deflection at the intersection point between the straights of the upper link and the trunnion. Assuming that the right-hand trunnion of FIG. 10B is brought into spot-contact with the upper link at an interference point or a contact point f with an intersection angle during ratio changing, a force γ acts on the upper link via contact point f. In case of the pin-support structure that the central portion of the upper link is pin-connected to toroidal CVT casing 1, pin 12a serves as a fulcrum point of a lever, contact point f serves as a power point (or a point of application), and a frictional contact portion between the inner peripheral wall surface of the support hole of upper link 16 and a combination joint (in particular, a spherical joint C) of a jointed portion between the left-hand trunnion of FIG. 10B and upper link 16 serves as a point of action. Owing to force γ acting on the upper link via contact point f, a reaction force δ acts on the frictional contact portion (serving as a point of action) between upper link 16 and the left-hand trunnion. On the other hand, pin 12a (serving as a fulcrum point of a lever) receives a resultant force ε of forces γ and δ. Note that, according to the principle of action and reaction, a force, which has the same magnitude as the force γ and acts in the direction opposite to the direction β, reacts on the right-hand trunnion, and a force, which has the same magnitude as the force δ and acts in the direction opposite to the direction α, acts on the left-hand trunnion. As appreciated from the analytical mechanics of FIG. 10B, the forces γ and δ act in the same direction of trunnion axis $O_2$. However, with respect to the circumferential direction of the input disk or the output disk, the direction of act of force γ is opposite to that of force δ. For the reasons discussed below, the forces γ and δ acting opposite to each other with respect to the circumferential direction of the input disk or the output disk, leads to the problem of a deterioration in torque distribution or torque allotment between a pair of power rollers 8, 8 included in each variator. In other words, forces γ and δ acting on the contact points cause a torque difference between the torque flowing through one of power rollers 8, 8 and the torque flowing through the other power roller, thereby resulting in an undesired slip (power loss) at the frictional engagement portion between the power roller and each of the input and output disks. The torque flowing through the power roller is calculated as the product of the distance (called "input contact radius") from a contact point between the power roller and the input disk to input/output-disk rotation axis $O_1$ and a force acting on the frictional engagement portion between the power roller and the input disk, or calculated as the product of the distance (called "output contact radius") from a contact point between the power roller and the output disk to common rotation axis $O_1$ and a force acting on the frictional engagement portion between the power roller and the output disk. To avoid or reduce the undesired slip, the grip force (the loading force) of the power roller must be increased. Taking into account the torque flow from the input disk via the power roller to the output disk, from the viewpoint of the vector analysis, a first force is applied from the input disk to the first frictional engagement portion of the power roller, and simultaneously a second force (a reaction force) is applied from the output disk to the second frictional engagement portion diametrically opposed to the first frictional engagement portion with respect to power-roller rotation axis $O_3$. In other words, during power transmission via the power roller, the trunnion (the power roller support) receives both the first and second forces, (in other words, twice the first force, because the magnitudes are the same in the first and second forces). The first and second forces have the same magnitude and act in the same sense or direction, that is, in the radial direction of the power roller. Thus, the resultant force of the first and second forces will be hereinafter referred to as "radial force" acting on the power roller. When maintaining the neutral position (the non-ratio-changing position), the same magnitude of hydraulic pressure applied to each servo piston of the trunnion pair is balanced to the radial force acting on the power roller. By way of Pascal's principle, the hydraulic pressure applied to the left-trunnion servo piston is adjusted to be equal to the hydraulic pressure applied to the right-trunnion servo piston. Ratio changing is achieved by increasing or decreasing the hydraulic pressure, applied to each servo piston, from the hydraulic pressure level corresponding to the radial force acting on the power roller. An upshift occurs by increasing the hydraulic pressure. In contrast, a downshift occurs by decreasing the hydraulic pressure. In presence of the previously-noted forces γ and δ having almost the same magnitude but different sense with respect to the circumferential direction of the input/output disk, there is a tendency for the hydraulic pressure applied to the servo piston to be unbalanced to the radial force acting on the power roller. This deteriorates torque distribution between a pair of power rollers 8, 8 included in each variator. If a comparatively large torque is allotted to one of the two power rollers included in each variator due to such a deteriorated torque distribution, there is an increased tendency for the one power roller to slip. To avoid this, the grip force (the loading force) must be increased. This leads to the problem that a mechanical strength of each toroidal CVT part is enhanced and thus the toroidal CVT is large-sized. Additionally, the conventional toroidal CVT uses the complicated pin-support structure as described previously. This leads to the problem that the number of parts constructing the toroidal CVT increases. Manufacturing costs also increase. Additionally, due to an increase in the loading force, the rigidity of each of the upper and lower links must be enhanced. In case that square hole $h_2$ is formed in the upper link (or in the lower link) and located midway between support holes $h_1$, $h_1$ supporting the trunnion pair 14, 14, the rigidity of each of the upper and lower links must be further enhanced. This leads to the problem that the thickness of the upper or lower link must be further increased.

SUMMARY OF THE INVENTION

Accordingly, it is an object of the invention to provide a toroidal continuously variable transmission having an improved link support structure, which avoids the aforementioned disadvantages.

In order to accomplish the afore mentioned and other objects of the present invention, a toroidal continuously variable transmission comprises input and output disks opposed to each other and coaxially arranged on a common rotation axis, a plurality of power rollers interposed between the input and output disks under axial preload for power transmission, a plurality of trunnions rotatably supporting the respective power rollers to permit a tilting motion of each of the power rollers about a trunnion axis perpendicular to a power-roller rotation axis for ratio changing, an upper link that mechanically links upper ends of the trunnions to each other, a lower link that mechanically links lower ends of the trunnions to each other, a transmission casing, a link support structure that supports one of the upper and lower links in the transmission casing, the link support structure comprising a stationary portion fixed to an inner periphery of the transmission casing, and an engagement portion formed at the one link and in engagement with the stationary portion to provide an engagement pair, the engagement pair restricting a fore-and-aft movement of the one link relative to the transmission casing in a fore-and-aft direction along the common rotation axis, and a freedom for the fore-and-aft movement of the one link relative to the transmission casing being relatively less than a freedom for a vertical movement of the one link relative to the transmission casing in a vertical direction along the trunnion axis and relatively less than a freedom for a left-and-right movement of the one link relative to the transmission casing in a left-and-right direction normal to both the common rotation axis and the trunnion axis.

According to another aspect of the invention, a double-cavity type toroidal continuously variable transmission with two variators opposed to each other and set in tandem and coaxially arranged in an interior space of a transmission casing, each variator comprising input and output disks opposed to each other and coaxially arranged on a common rotation axis, a plurality of power rollers interposed between the input and output disks under axial preload for power transmission, a plurality of trunnions rotatably supporting the respective power rollers to permit a tilting motion of each of the power rollers about a trunnion axis perpendicular to a power-roller rotation axis for ratio changing, an upper link that mechanically links upper ends of the trunnions to each other, a lower link that mechanically links lower ends of the trunnions to each other, a link support structure that supports one of the upper and lower links in the transmission casing, the link support structure comprising a stationary portion fixed to an inner periphery of the transmission casing, and an engagement portion formed at the one link and in engagement with the stationary portion to provide an engagement pair, the engagement pair restricting a fore-and-aft movement of the one link relative to the transmission casing in a fore-and-aft direction along the common rotation axis, and a freedom for the fore-and-aft movement of the one link relative to the transmission casing being relatively less than a freedom for a vertical movement of the one link relative to the transmission casing in a vertical direction along the trunnion axis and relatively less than a freedom for a left-and-right movement of the one link relative to the transmission casing in a left-and-right direction normal to both the common rotation axis and the trunnion axis.

According to a still further aspect of the invention, a double-cavity type toroidal continuously variable transmission with two variators opposed to each other and set in tandem and coaxially arranged in an interior space of a transmission casing, each variator comprising input and output disks opposed to each other and coaxially arranged on a common rotation axis, a plurality of power rollers interposed between the input and output disks under axial preload for power transmission, a plurality of trunnions rotatably supporting the respective power rollers to permit a tilting motion of each of the power rollers about a trunnion axis perpendicular to a power-roller rotation axis for ratio changing, an upper link that mechanically links upper ends of the trunnions to each other, a lower link that mechanically links lower ends of the trunnions to each other, a link support structure that supports one of the upper and lower links in the transmission casing, the link support structure comprising a stationary portion fixed to an inner periphery of the transmission casing, and an engagement portion including a central hole, which is formed in the one link and located substantially in a middle portion of the first and second variators, an inner periphery of the central hole being in engagement with the stationary portion to provide an engagement pair, the engagement pair restricting a fore-and-aft movement of the one link relative to the transmission casing in a fore-and-aft direction along the common rotation axis, and a freedom for the fore-and-aft movement of the one link relative to the transmission casing being relatively less than a freedom for a vertical movement of the one link relative to the transmission casing in a vertical direction along the trunnion axis and relatively less than a freedom for a left-and-right movement of the one link relative to the transmission casing in a left-and-right direction normal to both the common rotation axis and the trunnion axis.

The other objects and features of this invention will become understood from the following description with reference to the accompanying drawings.

BRIEF DESCRIPTION OF THE DRAWINGS

FIG. 2A is a cross-sectional view taken along the line IIA—IIA of FIG. 1.

FIG. 2B is a somewhat enlarged view showing only a jointed portion between the upper link and the upper end of the trunnion, in the link support structure of the first embodiment.

DESCRIPTION OF THE PREFERRED EMBODIMENTS

Figure 1:
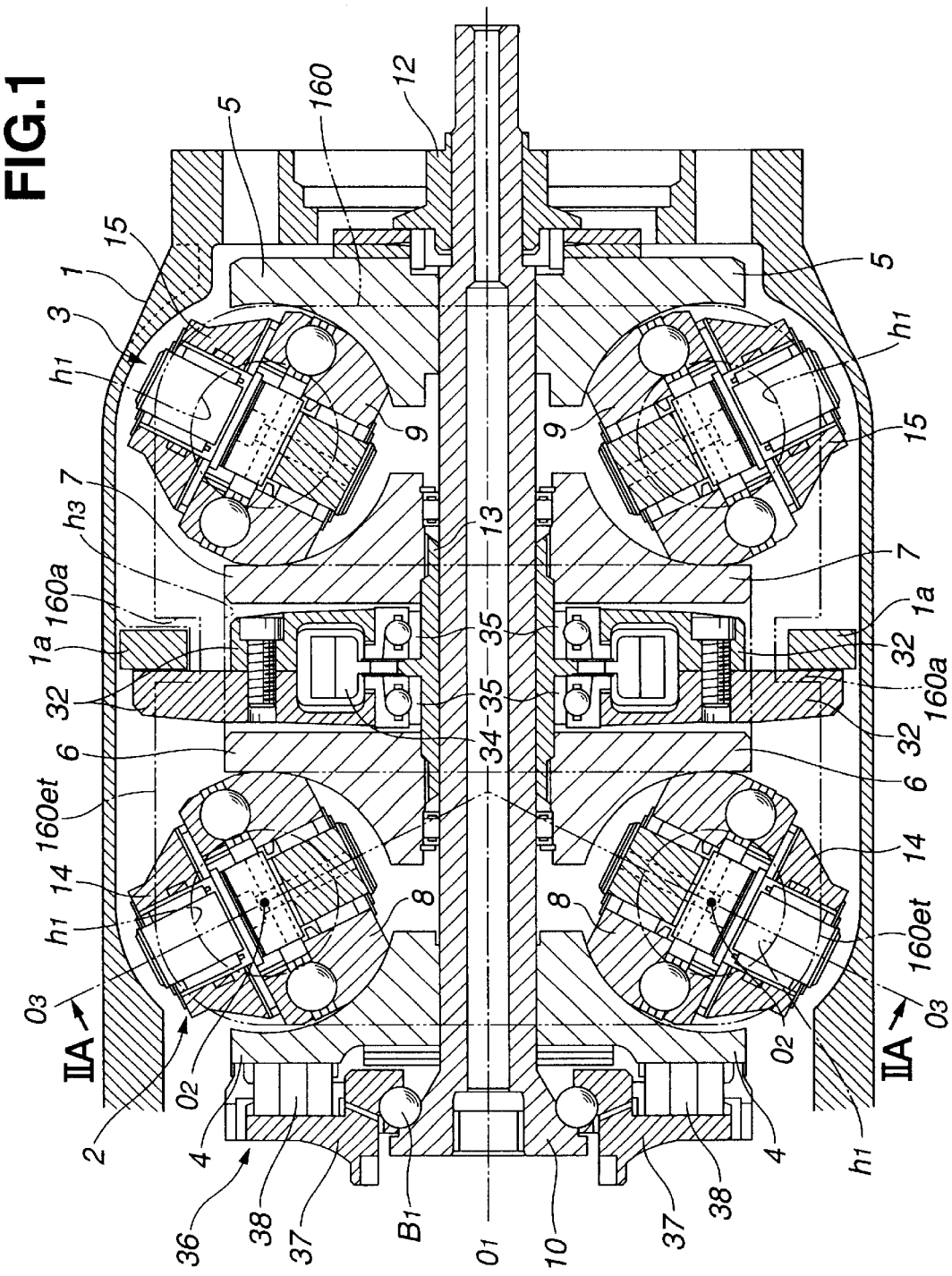
FIG. 1 is a top cross-sectional view of a toroidal CVT having a link support structure of a first embodiment, viewed from the direction of trunnion axis $O_2$.
Figure 3:
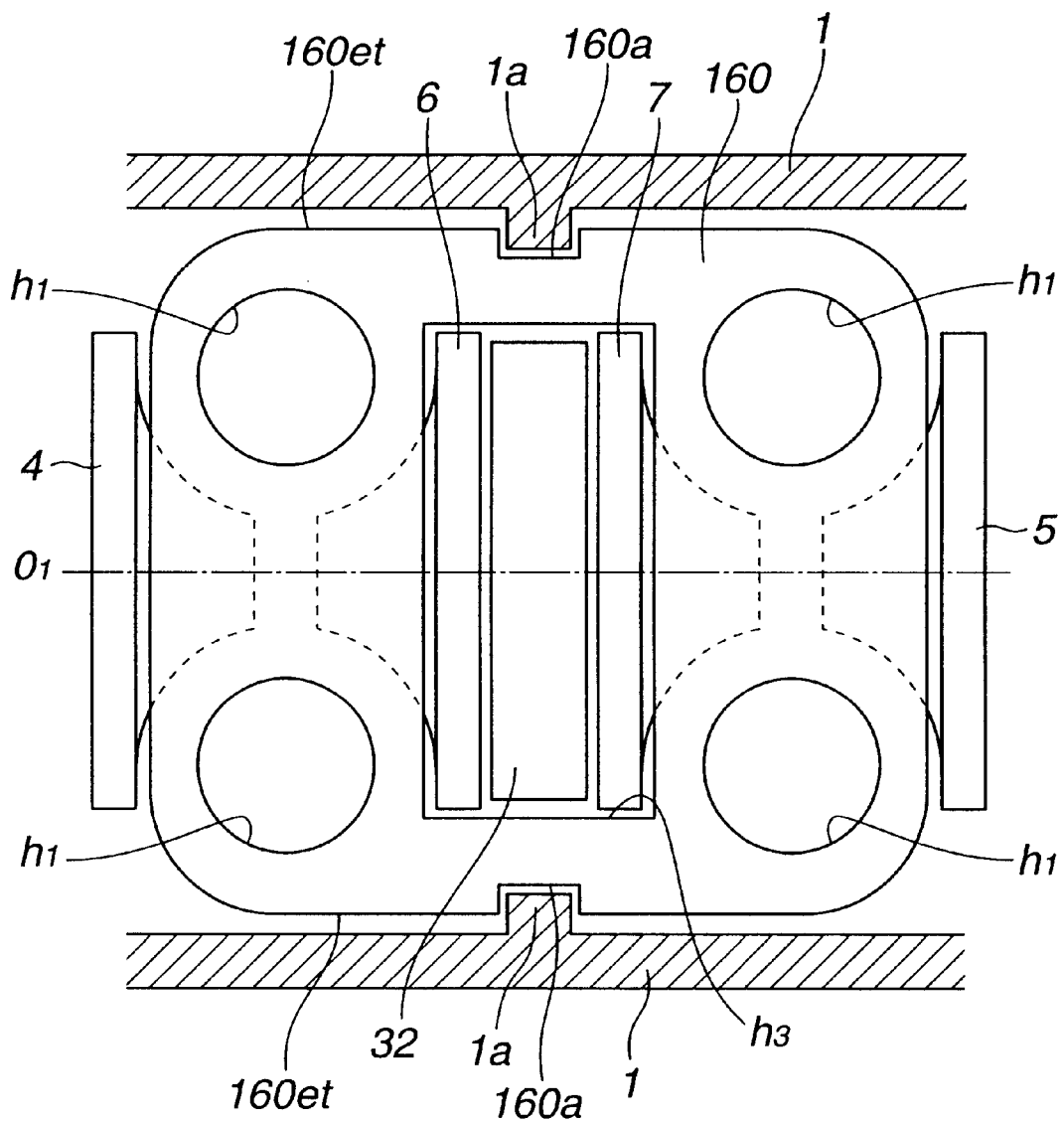
FIG. 3 is a top view showing the upper link support structure of the first embodiment.

Referring now to the drawings, particularly to FIGS. 1 through 3, a toroidal continuously variable transmission (toroidal CVT) link support structure of the embodiment is exemplified in a double cavity type half-toroidal continuously variable transmission. As shown in FIG. 1, in order to double a capacity of power (engine torque) transmitted, the double cavity type toroidal CVT has two variators, namely a first variator (a front toroidal CVT mechanism) 2 and a second variator (a rear toroidal CVT mechanism) 3, opposed to each other and set in tandem and coaxially arranged in the interior space of a toroidal CVT casing 1. The constructions are the same in the front and rear toroidal CVT mechanisms. Variator 2 (3) is mainly comprised of an input disk 4 (5), an output disk 6 (7), a pair of power rollers 8, 8 (9, 9), a pair of trunnions 14, 14 (15, 15), an upper link 160, and a lower link 17. Input disk 4 (5) and output disk 6 (7) are coaxially arranged with each other with respect to common rotation axis $O_1$. Each of trunnions 14, 14 (15, 15) serves as a power roller support that rotatably supports one of power rollers 8, 8 (9, 9) each interposed or gripped between input and output disks and is in contact with a torus surface of each of the input and output disks under preload (under a loading force). Upper link 160 functions to mechanically link upper ends of trunnions 14, 14, 15, 15 to each other. Lower link 17 functions to mechanically link lower ends of trunnions 14, 14, 15, 15 to each other. Two output disks 6 and 7 are coaxially arranged so that the backface of output disk 6 included in the first variator and the backface of output disk 7 included in the second variator are faced to each other. As clearly shown in FIG. 1, power rollers 8, 8 (9, 9) are symmetrically arranged to each other with respect to a main torque transmission shaft 10 (or with respect to common rotation axis $O_1$ of the input and output disks). First and second variators 2 and 3 are arranged in reverse to each other on main torque transmission shaft 10. Main torque transmission shaft 10 is rotatably supported in toroidal CVT casing 1. Input (4, 5) and output (6, 7) disks of first and second variators 2 and 3 are supported on main torque transmission shaft 10. Each input disk (4, 5) is supported on main torque transmission shaft 10 by way of ball-spline-engagement, so as to permit each input disk (4, 5) to axially move relative to the main torque transmission shaft, and to rotate about the main torque transmission shaft. The rear input disk 5 included in second variator 3 is retained in place by means of a locknut 12. The front output disk 6 included in first variator 2 and the rear output disk 7 included in second variator 3 are integrally connected to each other via a cylindrical hollow output shaft 13. Cylindrical hollow output shaft 13 is coaxially rotatably mounted on main torque transmission shaft 10. As can be seen from the cross-sectional views shown in FIGS. 1 and 2A, a first set of power rollers 8, 8 included in first variator 2 are rotatably supported by the respective trunnions 14, 14, while a second set of power rollers 9, 9 included in second variator 3 are rotatably supported by the respective trunnions 15, 15. The constructions and shapes are the same in the front and rear trunnion sets. As best seen in FIG. 3, upper link 160 is disk-shaped and substantially rectangular and has four rounded edges. Upper link 160 is formed with four trunnion support holes $h_1$, $h_1$, $h_1$, $h_1$ located near the four rounded edges. Upper ends of two trunnions 14, 14 included in first variator 2 and upper ends of two trunnions 15, 15 included in second variator 3 are mechanically linked to each other by way of the upper link in the vicinity of the inner periphery of the top wall of toroidal CVT casing 1. Actually, the upper ends of four trunnions 14, 14, 15, and 15 are inserted into and linked to the respective trunnion support holes ($h_1$, $h_1$, $h_1$, $h_1$) via combination joints (described later) each comprised of a spherical joint 18 and a bearing 19. Upper link 160 is also formed with a comparatively large, central rectangular hole $h_3$, which is provided substantially in a middle portion of first and second variators 2 and 3 so as to avoid the interference between the upper link and output disks 6 and 7 of first and second variators 2 and 3. In FIGS. 1 and 3, reference sign 1*a* denotes an inwardly protruded, rib-shaped stationary portion, which is fixedly connected to or integrally formed with CVT casing 1. Two stationary portions 1*a*, 1*a* are engaged with or fitted to or in contact with respective recessed portions 160*a*, 160*a* formed on both sides (on left and right sides) of upper link 160, so as to permit oscillating motion of upper link 160 with respect to CVT casing 1, while greatly restricting fore-and-aft movement of upper link 160 relative to CVT casing 1. In contrast, as can be seen in FIG. 2A, the lower link support structure of the first embodiment is similar to the conventional pin-support structure. That is, lower link 17 is also formed therein with two pairs of trunnion support holes $h_1$, $h_1$, $h_1$, $h_1$, each pair $h_1$, $h_1$ associated with the two trunnions included in one of the first and second variators. As viewed from the cross section of FIG. 2A, a substantially square hole $h_2$ is formed in the lower link and located midway between lower-left and lower-right trunnion support holes $h_1$, $h_1$ supporting the trunnion pair 14, 14 included in first variator 2. In the same manner, a substantially square hole $h_2$ is formed in the lower link and located midway between trunnion support holes $h_1$, $h_1$ supporting the trunnion pair 15, 15 included in second variator 3. Lower link 17 is pivotally supported by way of a pair of link posts or a pair of link supports 40, 40, passing through the respective square hole $h_2$, $h_2$. Link support 40 is securely connected to CVT casing 1 by means of a bolt. In the conventional manner, lower link 17 is pivotally supported by way of pins 12*b*, 12*b*, 12*b*, 12*b*, which are aligned with each other in the direction of common rotation axis $O_1$ of the input and output disks and fitted into respective pin insertion holes 40*h*, 40*h*, 40*h*, 40*h*. In the same manner as the upper link, lower link 17 is disk-shaped and substantially rectangular and has four rounded edges. Four trunnion support holes $h_1$, $h_1$, $h_1$, $h_1$ of lower link 17 are located near the four rounded edges. Lower link 17 is also formed with a comparatively large, central rectangular hole $h_3$, required to avoid the interference between the lower link and output disks 6 and 7 of first and second variators 2 and 3.

Referring now to FIG. 2B, there is shown the detailed structure of a jointed portion between each trunnion (14, 14) and upper link 160. The structure of the joined portion of lower link 17 is somewhat similar to that of upper link 160. As clearly shown in FIG. 2B, the jointed portion is constructed as a combination joint comprised of spherical joint 18 and bearing 19. The external spherical surface of spherical joint 18 is fitted into the associated trunnion support hole $h_1$. Bearing 19 is fitted between the outer periphery of the upper cylindrical shaft end of trunnion 14 and the internal periphery of spherical joint 18. At the jointed portion between upper link 160 and the upper ends of trunnions 14, 14, the combination joints permit pivotal motion of the upper end of trunnion 14 relative to upper link 160 and a change in an intersection angle, which is an angle of deflection of the intersection point between the straights of upper link 160 and trunnion 14. Likewise, at the jointed portion between lower link 17 and the lower ends of trunnions 14, 14, the combination joints permit pivotal motion of the lower end of trunnion 14 relative to lower link 17 and a change in an intersection angle, which is an angle of deflection of the intersection point between the straights of lower link 17 and trunnion 14. As appreciated from the above, upper and lower links 160 and 17 cooperate with each other to prevent each power roller (8, 8, 9, 9) gripped between input and output disks 4 and 5 under axial preload (under a loading force) from being driven out from between the input and output disks. Each of servo pistons 42, 42, 42, 42 is coaxially connected onto the lower ends of trunnions 14, 14, 15, 15, so as to create tilting motion of each power roller (8, 8, 9, 9) by shifting trunnions 14, 14 of first variator 2 in opposite directions of their trunnion axes $O_2$, $O_2$ perpendicular to power-roller rotation axes $O_3$, $O_3$ and by shifting trunnions 15, 15 of second variator 3 in opposite directions of their trunnion axes $O_2$, $O_2$ perpendicular to power-roller rotation axes $O_3$, $O_3$. That is, all of the trunnions 14, 14, 15, 15 are shifted in phase and synchronously with each other by means of the four servo pistons. A control valve device 43 controls the four servo pistons. An output gear housing 32, serving as an intermediate wall, is located between the backface of output disk 6 included in first variator 2 and the backface of output disk 7 included in second variator 3. Output gear housing 32 is fixedly connected to CVT casing 1 by means of bolts (not shown). An output gear 34 is operatively accommodated in output gear housing 32. Output gear 34 is integrally connected to or formed integral with the outer periphery of cylindrical hollow output shaft 13. By means of ball bearings 35, 35 fitted between output gear housing 32 and cylindrical hollow output shaft 13, output gear housing 32 also functions to rotatably support the central portion of main torque transmission shaft 10 via cylindrical hollow output shaft 13 and ball bearings 35, 35, in such a manner as to permit relative rotation of main torque transmission shaft 10 to CVT casing 1. A counter gear (not shown) is in meshed-engagement with output gear 34 and fixedly connected to a countershaft (not shown), which is axially offset from main torque transmission shaft 10. Output disks 6 and 7 are linked to output gear 34 via cylindrical hollow output shaft 13 byway of spline-engagement. Power flow of the toroidal CVT of the embodiment is discussed hereunder.

Input rotation or input torque, transmitted to input disks 4 and 5, is further transferred from input disks 4 and 5 to the respective power rollers, so as to cause rotation of each power roller(8, 8, 9, 9) about its rotation axis $O_3$. Then, torque is transmitted from the power rollers via output disks 6 and 7 to output gear 34 common to the two output disks. The input torque is further transmitted from output gear 34 to the counter gear in meshed-engagement with output gear 34 and fixedly connected to the countershaft. Actually, input rotation transmitted from the left-hand side of FIG. 1 is input or transferred to input disk 4 of first variator 2 and input disk 5 of second variator 3 via a loading cam device 36.

Loading cam device 36 includes a cam flange 37 facing the backface of input disk 4 of first variator 2 and arranged coaxially with input disk 4. Cam flange 37 is rotatably supported on main torque transmission shaft 10 by means of an angular contact ball bearing $B_1$. Loading cam device 36 also includes a cam roller 38 disposed between input disk 4 and cam flange 37. Loading cam device 36 serves to transmit input rotation therevia to input disk 4 of first variator 2 and also serves to transmit input rotation through main torque transmission shaft 10 to input disk 5 of second variator 3. Loading cam device 36 is designed to produce axial preload (thrust) substantially proportional to input torque transmitted thereto. As can be appreciated from the cross section of FIG. 1, loading cam device 36 axially preloads input disk 4 of first variator 2 right wards so as to apply a thrust, which is substantially proportional to the magnitude of input torque and acts toward the output disk, to the input disk. At this time, a reaction force equivalent to the thrust is transferred from cam flange 37, through angular contact ball bearing $B_1$, main torque transmission shaft 10, and locknut 12, to input disk 5 of second variator 3. Thus, the reaction force acts to force input disk 5 of second variator 3 toward output disk 7 of second variator 3. As a result, the first power roller pair 8, 8 is gripped between input and output disks 4, 6 included in first variator 2 under the axial preload (the loading force) substantially proportional to the magnitude of torque input to the loading cam device. In a similar manner, the second power roller pair 9, 9 is gripped between input and output disks 5, 7 included in the second variator under the axial preload (the loading force) substantially proportional to the magnitude of torque input to the loading cam device.

With the previously-noted arrangement, the input rotation is transmitted from loading cam device 36 to input disk 4 of first variator 2. The input rotation transferred to input disk 4 is also transmitted through the ball spline (not shown), and main torque transmission shaft 10 to input disk 5 of second variator 3. The input rotation of input disk 4 of first variator 2 is transmitted to the first power roller pair 8, 8 in frictional contact therewith to rotate power rollers 8, 8 about their rotation axes $O_3$, $O_3$, while the input rotation of input disk 5 of second variator 3 is transmitted to the second power roller pair 9, 9 in frictional contact therewith to rotate power rollers 9, 9 about their rotation axes $O_3$, $O_3$. Torque transmitted to the first power roller pair 8, 8 is further transmitted to output disk 6 in frictional contact with them, while torque transmitted to the second power roller pair 9, 9 is further transmitted to output disk 7 in frictional contact with them. The torques transmitted to output disks 6 and 7 are transmitted to output gear 34 common to the two output disks, and then transmitted via the counter gear (not shown) to the countershaft (not shown). In this manner, the power or torque can be extracted from the countershaft. For the purpose of ratio changing, first, all of power rollers 8, 8, 9, 9 are shifted or displaced from their neutral positions (shown in FIGS. 1 and 2A) in phase and synchronously with each other in trunnion axes $O_2$, $O_2$, $O_2$, $O_2$ perpendicular to power-roller rotation axes $O_3$, $O_3$, $O_3$, $O_3$ through trunnions 14, 14, 15, 15 by means of servo pistons 42, 42, 42, 42. The neutral position corresponds to a non-ratio-changing position at which the power-roller rotation axis $O_3$ intersects common rotation axis $O_1$. Shifting power rollers 8, 8, 9, 9 from their neutral positions means an offset (a vertical displacement) of each of power-roller rotation axes $O_3$, $O_3$, $O_3$, $O_3$ from common rotation axis $O_1$. Owing to the offset or vertical displacement, a side slip force occurs in a very limited contact zone between each of the power rollers and the associated input and output disks. By virtue of the side slip forces, the power rollers can be self-tilted or self-inclined in phase and in synchronization about the respective trunnion axes $O_2$, $O_2$, $O_2$, $O_2$. Owing to the self-inclining motion of each of the power rollers, a first diameter of a circular-arc shaped locus drawn by movement of the very limited contact point between each of the power rollers and the output disk on the torus surface of the output disk and a second diameter of a circular-arc shaped locus drawn by movement of the very limited contact point between each of the power rollers and the input disk on the torus surface of the input disk, that is, a ratio of the first diameter to the second diameter can be continuously varied, thus continuously varying a transmission ratio of the double cavity type toroidal CVT. The first diameter corresponds to half the previously-described output contact radius, whereas the second diameter corresponds to half the previously-described input contact radius. On the other hand, a degree of progress for transmission-ratio changing mechanically fed back to the hydraulic servo mechanism, that is, servo pistons 42, 42, 42, 42 by means of a forward precision cam (not shown) in the forward running mode and by means of a reverse precision cam (not shown) in the reverse running mode, such that each of the trunnions gradually returns to its initial position as the ratio changing progresses or advances. As soon as the gyration angle based on the desired transmission ratio corresponding to a transmission-ratio command signal value has been reached, the offset or vertical displacement of each trunnion (14, 14, 15, 15) is returned to zero, so as to stop the inclining motion of each power roller (8, 8, 9, 9), and to attain the return of each power roller to neutral, and thus to maintain the desired transmission ratio corresponding to the ratio command signal value.

In the upper link support structure of the first embodiment, as discussed previously in reference to FIGS. 1 and 2A, two stationary portions 1a, 1a are fixedly connected to or integrally formed with the inner periphery of CVT casing 1, such that the stationary portions face to respective sides 160et, 160et of upper link 160. On the other hand, two recessed portions 160a, 160a are formed on both sides (on left-hand side 160et and right-hand side 160et) of upper link 160. The two recessed portions are aligned with each other in the lateral direction (the left-and-right direction) normal to both the longitudinal direction along common rotation axis $O_1$ and the vertical direction along trunnion axis $O_2$. Each recessed portion (160a, 160a) is rectangular in cross section, and two opposing wall surface of the rectangular recessed portion 160a is normal to common rotation axis $O_1$ of the input and output disks. Recessed portions 160a, 160a are engaged with or fitted to the respective stationary portions 1a, 1a. By fitting recessed portions 160a, 160a to the respective stationary portions 1a, 1a, it is possible to greatly restrict or constrain movement of upper link 160 in the longitudinal direction (i.e., in the direction of common rotation axis $O_1$). That is, upper link 160 is supported on CVT casing 1 in a state that the longitudinal movement of upper link 160 relative to CVT casing 1 is greatly restricted. According to the link support structure of the first embodiment, upper link 160 and lower link 17 are displaceable relative to the CVT casing in the direction of trunnion axis $O_2$. Assuming that the displacement of each of upper and lower links 160 and 17 is excessively large, there is a possibility of the interference between each trunnion (14, 14, 15, 15) with the other parts. To avoid such an excessive displacement of upper link 160 in the trunnion-axis $O_2$ direction, a stepped portion 14a and a stopper plate S are provided at each trunnion end linked to the upper link. For instance, as best seen in FIG. 2B, stepped portion 14a is formed at the upper end of the trunnion in such a manner as to receive thereon both the spherical joint 18 and bearing 19. Stopper plate S is interposed between a snap ring R fitted to the upper end of the trunnion and the upper face of upper link 160. Stepped portion 14a and stopper plate S cooperate with each other and serve as a motion restricting means that restricts or constrains the movement of upper link 160 in the direction of trunnion axis $O_2$. As can be appreciated from the upper half (the top view) of FIG. 2B, for easy installation of the trunnion on the upper link, it is preferable to form each trunnion support hole $h_1$ as an elliptic hole having a major axis in the lateral direction normal to both the longitudinal direction along common rotation axis $O_1$ and the vertical direction along trunnion axis $O_2$ and a minor axis in the direction of common rotation axis $O_1$. More concretely, the outside diameter of stopper plate S is dimensioned to be greater than the length of the minor axis of elliptic hole $h_1$ and to be smaller than the length of the major axis of elliptic hole $h_1$. From the viewpoint of an enhanced mechanical strength or rigidity of upper link 160, it is preferable to form each trunnion support hole $h_1$ as a circular hole having an inside diameter equal to the length of the minor axis of trunnion support hole $h_1$ formed as an elliptic hole. That is, the trunnion support hole formed as a circular hole is superior in the enhanced rigidity and inferior in easy installation. The upper link support structure of the first embodiment is different from the previously-described conventional pin-support structure that requires pins and link posts. Thus, in case of the use of the elliptic link support hole $h_1$, the length of the major axis of the elliptic hole must be properly dimensioned, balancing two contradictory requirements, namely an allowable rigidity of upper link 160 and time saved in installation. In contrast to the upper-link jointed portion, in case of the lower-link jointed portion, to avoid an excessive displacement of lower link 17 in the direction of trunnion axis $O_2$, a stepped portion 14b and a synchronous self-tilting motion wire pulley or a first-and-second variator synchronous wire pulley 31 are provided at each trunnion end linked to the lower link. As clearly seen in FIG. 2A, stepped portion 14b is formed at the lower end of the trunnion in such a manner as to receive thereon both the spherical joint 18 and bearing 19. Each of the four rounded edged portions of lower link 17 is sandwiched between stepped portion 14b and the upper face of first-and-second variator synchronous wire pulley 31. Stepped portion 14b and first-and-second variator synchronous wire pulley 31 cooperate with each other and serve as a motion restricting means that restricts or constrains the movement of lower link 17 in the direction of trunnion axis $O_2$. As a matter of course, proper clearances or apertures are provided at the respective jointed portions, so that the combination joints, each comprised of spherical joint 18 and bearing 19, permit pivotal motion of the upper end of the trunnion relative to upper link 160 and a change in the intersection angle, which is an angle of deflection of the intersection point between the straights of upper link 160 and the trunnion, and permit pivotal motion of the lower end of the trunnion relative to lower link 17 and a change in the intersection angle, which is an angle of deflection of the intersection point between the straights of lower link 17 and the trunnion. In the shown embodiment, four sets of motion restricting means (14a, S, 14b, 31; 14a, S, 14b, 31; 14a, S, 14b, 31; 14a, S, 14b, 31) are provided near four trunnion support holes located in close proximity to four rounded edged portions of each of upper and lower links 160 and 17. In order to provide the same motion restricting effect in the direction of trunnion axis $O_2$, two sets of motion restricting means (14a, S, 14b, 31; 14a, S, 14b, 31) may be provided at only the upper-right and lower-left jointed portions (viewing FIG. 3) greatly spaced apart from each other in the diagonal direction or at only the upper-left and lower-right jointed portions. This reduces total manufacturing costs of the toroidal CVT.

The link support structure of the first embodiment that recessed portions 160a, 160a formed on left and right sides 160et, 160et of upper link 160 are fitted to the respective laterally-protruded stationary portions 1a, 1a of the CVT casing, provides the following effects. That is, there is no risk that the previously-noted forces γ and δ having almost the same magnitude but different sense with respect to the circumferential direction of the input/output disk, occur, even in the presence of a change of the intersection angle, corresponding to an angle of deflection of the intersection point between the straights of the upper link and the trunnion. This is because the upper link support structure of the first embodiment is not the conventional pin-support structure that uses a pin as a fulcrum point of a lever, and engagement between stationary portion 1a and recessed portion 160a permits sliding motion of the upper link relative to the CVT casing in the direction of trunnion axis $O_2$. In other words, even in the presence of a change of the intersection angle during ratio changing, it is possible to prevent torque distribution between the power rollers included in each variator (2, 3) from being unbalanced or deteriorated, thus eliminating the problem of undesired slip of the power roller arising from the deteriorated torque distribution. This contributes to a reduction in a design loading force for loading cam device 36, thus downsizing the toroidal CVT. Instead of using the conventional pin-support structure, the upper link support structure of the first embodiment utilizes a vertically sliding fit between stationary portion 1a and recessed portion 160a that permits the vertical movement of upper link 160 relative to CVT casing 1 and greatly restricts the fore-and-aft movement of upper link 160 relative to CVT casing 1. The upper link support structure of the first embodiment is simple in construction. This reduces the number of parts constructing the toroidal CVT. The vertically sliding fit portion (1a, 160a) between upper link 160 and CVT casing 1 is easy and simple in machining process, thus reducing the production costs of toroidal CVTs. Furthermore, the upper link support structure of the first embodiment eliminates the necessity of square holes $h_2$, $h_2$ each formed in the upper link and located midway between a pair of trunnion support holes $h_1$, $h_1$ for passing a pair of link posts through the respective square holes $h_2$, $h_2$, since the upper link support structure of the first embodiment does not use the conventional pin-support structure. That is, the upper link of the first embodiment not having square holes $h_2$, $h_2$ is advantageous with respect to enhanced mechanical strength and rigidity. It is unnecessary to increase the thickness of upper link 160 to supply a lack in the upper-link mechanical strength and rigidity, which may occur owing to the square holes $h_2$, $h_2$. Additionally, in the upper link support structure of the first embodiment, the two engagement pairs (1a, 160a; 1a, 160a) between the CVT casing and the upper link are symmetrical with respect to common rotation axis $O_1$ of the input and output disks. Two recessed portions 160a, 160a fitted to the respective stationary portions 1a, 1a of the CVT casing, are symmetrically located at the central portions of the left-hand side 160et and right-hand side 160et of upper link 160. Thus, a frictional force, occurring owing to relative motion of upper link 160 to CVT casing 1 in the direction of common rotation axis $O_1$, is equally distributed to the two engagement pairs or the two contact pairs (1a, 160a; 1a, 160a). By way of the symmetrical arrangement of the two engagement pairs (1a, 160a; 1a, 160a), a frictional force allotted to or a bearing stress occurring at one of the two engagement pairs owing to the relative motion can be effectively reduced. Due to the effectively reduced friction, the upper link support structure of the first embodiment permits a smooth pivotal motion of the upper end of each trunnion (14, 14, 15, 15) relative to upper link 160 and a smooth change in the intersection angle. This avoids torque allotment between a pair of power rollers included in each of first and second variators 2 and 3 from deteriorating owing to the applied force from the upper link to each trunnion (14, 14, 15, 15). In the first embodiment, each of the two engagement pairs (1a, 160a; 1a, 160a) is comprised of stationary portion 1a formed as a protruded portion inwardly protruded from the inner wall of CVT casing 1 toward common rotation axis $O_1$, and an engagement portion (engaging with stationary portion 1a) formed as a recessed portion 160a formed on each side 160et of upper link 160. In lieu thereof, stationary portion 1a of the engagement pair may be formed as a recessed portion formed on the inner peripheral wall of CVT casing 1 and the engagement portion may be formed as a protruded portion protruded from and formed on each side 160et of upper link 160.

Figure 4:
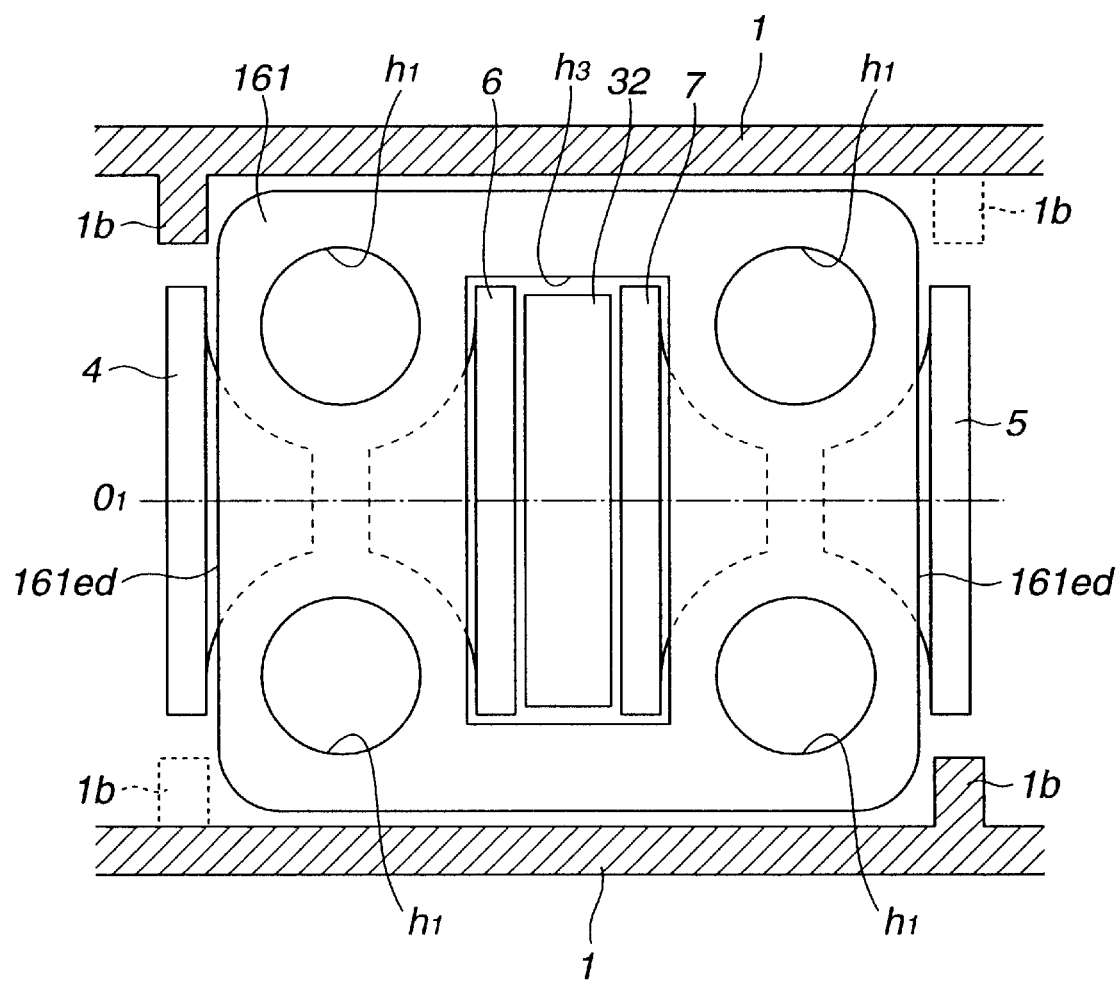
FIG. 4 is a top view showing the upper link support structure of a second embodiment.

Referring now to FIG. 4, there is shown the upper link support structure of the second embodiment. For the purpose of comparison of the first and second embodiments, the same reference signs used to designate elements shown in the upper link support structure of the first embodiment (see FIG. 3) will be applied to the corresponding elements shown in the second embodiment (see FIG. 4). As can be appreciated from comparison of the upper link support structures of the first and second embodiments shown in FIGS. 3 and 4, the two engagement pairs (1a, 160a; 1a, 160a) of the first embodiment of FIG. 3 are replaced with two engagement pairs (1b, 161ed; 1b, 161ed) of the second embodiment of FIG. 4. In more detail, in the upper link support structure of the second embodiment, the first inwardly protruded, rib-shaped stationary portion 1b, engaged with or being in contact with the front end wall 161ed of an upper link 161, and the second inwardly protruded, rib-shaped stationary portion 1b, engaged with or being in contact with the rear end wall 161ed of upper link 161, provide the same operation and effects as the engagement pairs (1a, 160a; 1a, 160a) of the first embodiment. That is, two engagement pairs (1b, 161ed; 1b, 161ed) of the second embodiment are point-symmetrical with respect to the central point of the upper link and arranged diagonally with respect to common rotation axis $O_1$. In the second embodiment, stationary portion 1b is comprised of a protruded portion laterally inwardly protruded from the inner wall of CVT casing 1, while the engagement portion engaging with stationary portion 1b is comprised of end wall 161ed of upper link 161. As can be seen from the top view of FIG. 4, the two engagement pairs (1b, 161ed; 1b, 161ed) of the second embodiment serve to permit oscillating motion of upper link 161 with respect to CVT casing 1, while greatly restricting fore-and-aft movement of upper link 161 relative to CVT casing 1. According the upper link support structure of the second embodiment, there is no risk that the previously-noted forces γ and δ having almost the same magnitude but different sense with respect to the circumferential direction of the input/output disk, occur, even in the presence of a change of the intersection angle. That is, even in the presence of a change of the intersection angle during ratio changing, it is possible to prevent torque distribution between the power rollers included in each variator (2, 3) from being unbalanced or deteriorated, thus eliminating the problem of undesired slip of the power roller arising from the deteriorated torque distribution, and thereby reducing a design loading force for loading cam device 36 and downsizing the toroidal CVT. The engagement pairs (1b, 161ed; 1b, 161ed) of the second embodiment permit the vertical movement of upper link 161 relative to CVT casing 1 and greatly restrict the fore-and-aft movement of upper link 161 relative to CVT casing 1, without using the conventional pin-support structure. The upper link support structure of the second embodiment is simple in construction, thus reducing the number of parts constructing the toroidal CVT. According to the upper link support structure of the second embodiment, it is unnecessary to machine or form recessed portions 160a, 160a in both sides of upper link 161. This more effectively reduces production costs of toroidal CVTs. Furthermore, in the same manner as the first embodiment, the upper link support structure of the second embodiment eliminates the necessity of square holes $h_2$, $h_2$ each formed in the upper link and located midway between a pair of trunnion support holes $h_1$, $h_1$. The upper link of the second embodiment not having square holes $h_2$, $h_2$ is advantageous with respect to enhanced mechanical strength and rigidity. It is unnecessary to increase the thickness of upper link 161 to supply a lack in the upper-link mechanical strength and rigidity, which may occur owing to the square holes $h_2$, $h_2$. As clearly shown in FIG. 4, from the viewpoint of structural simplicity and reduced manufacturing costs, stationary portion 1b of the front engagement pair (1b, 161ed) and stationary portion 1b of the rear engagement pair (1b, 161ed) are arranged point-symmetrical with respect to the center of upper link 161, so as to effectively restrict the fore-and-aft movement of upper link 161 relative to CVT casing 1 with the minimum engagement pairs, that is, two engagement pairs (1b, 161ed; 1b, 161ed). In lieu thereof, from the viewpoint of enhanced reliability and enhanced mechanical strength of the upper link support structure, in addition to a first group of engagement pairs (1b, 161ed; 1b, 161ed) indicated by the solid line, a second group of engagement pairs (1b, 161ed; 1b, 161ed) indicated by the phantom line in FIG. 4 may be added.

Figure 5:
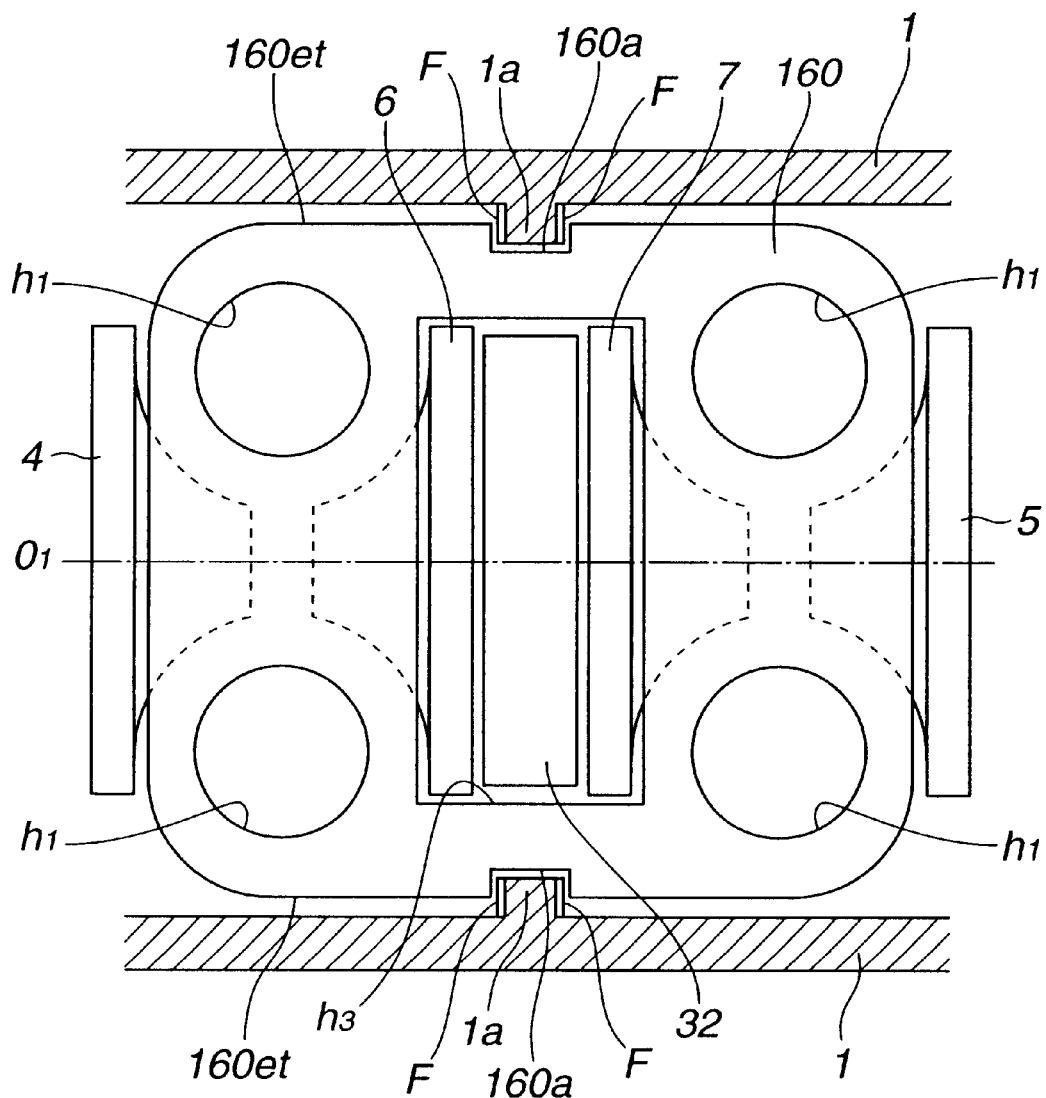
FIG. 5 is a top view showing the upper link support structure of a third embodiment.

Referring now to FIG. 5, there is shown the upper link support structure of the third embodiment. The upper link support structure of the third embodiment of FIG. 5 is slightly different from that of the first embodiment of FIG. 3, in that a pair of low-friction members F, F are attached onto both sides of stationary portion 1a, which is brought into abutted-engagement with the inner peripheral wall of recessed portion 160a. For instance, low-friction member F is made of a synthetic resin material having a low friction coefficient. Thus, friction between the upper link and each of stationary portions 1a, 1a of CVT casing 1, occurring owing to relative motion of upper link 160 to CVT casing 1 in the direction of common rotation axis $O_1$, can be more effectively reduced by means of low-friction member F provided on the contact surface between the upper link and the stationary portion fixed to the CVT casing. Due to the more effectively reduced friction, the upper link support structure of the third embodiment permits a more smooth pivotal motion of the upper end of each trunnion (14, 14, 15, 15) relative to upper link 160 and a smooth change in the intersection angle. This avoids torque allotment between a pair of power rollers included in each of first and second variators 2 and 3 from deteriorating owing to the applied force from the upper link to each trunnion (14, 14, 15, 15).

Figure 6:
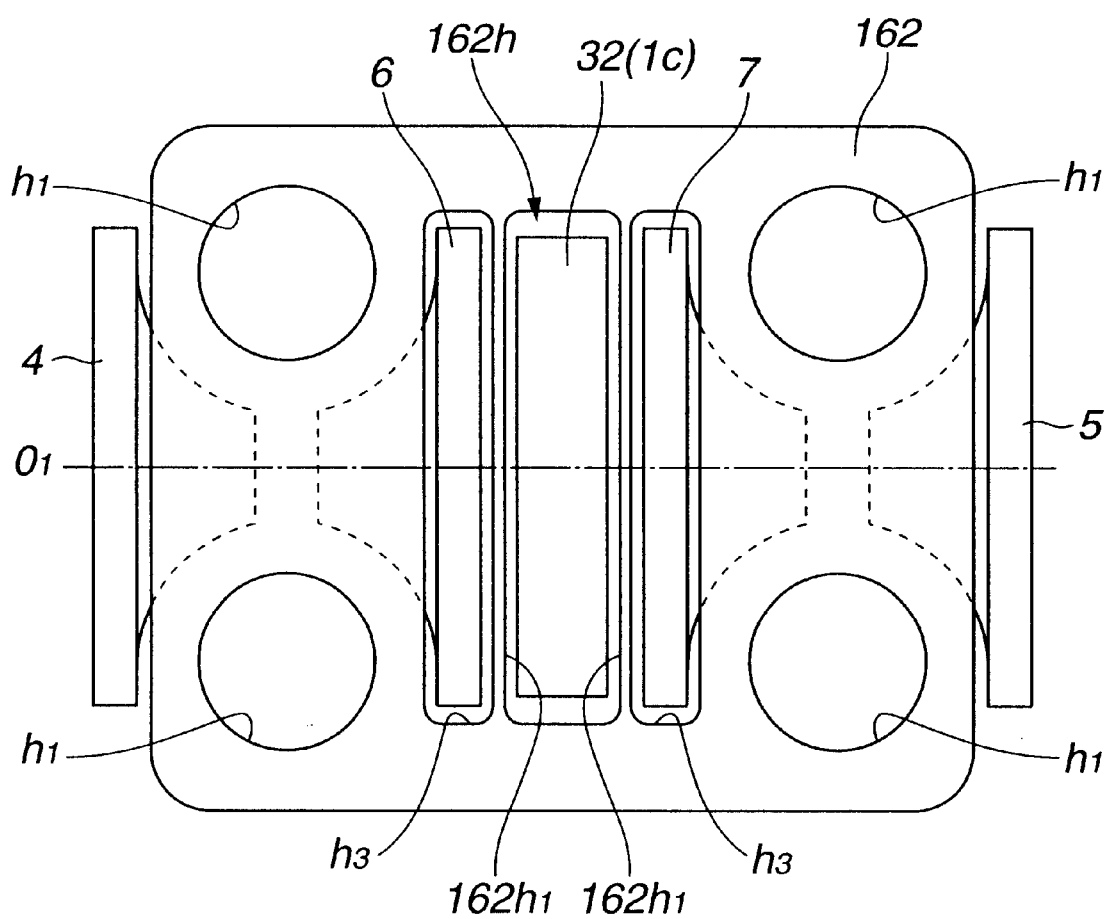
FIG. 6 is a top view showing the upper link support structure of a fourth embodiment.

Referring now to FIG. 6, there is shown the upper link support structure of the fourth embodiment. For the purpose of comparison among the first and fourth embodiments, the same reference signs used to designate elements shown in the upper link support structure of the first embodiment (see FIG. 3) will be applied to the corresponding elements shown in the fourth embodiment (see FIG. 6). In the upper link support structure of the fourth embodiment, a pair of elongated rectangular holes $h_3$, $h_3$ are formed in an upper link 162, which mechanically links first and second variators 2 and 3 set in tandem and coaxially arranged with respect to common rotation axis $O_1$, so as to avoid the interference between the upper link and output disks 6 and 7 of first and second variators 2 and 3. A central rectangular elongated hole 162h is formed substantially in the center of upper link 162 and located substantially in a middle portion of the first and second variators and midway between elongated rectangular holes $h_3$, $h_3$. As can be seen in FIG. 6, three elongated holes $h_3$, 162h, $h_3$ are arranged symmetrical with respect to common rotation axis $O_1$. The front elongated rectangular hole $h_3$ engages with the upper port ion of output disk 6 of first variator 2, while the rear elongated rectangular hole $h_3$ engages with the upper portion of output disk 7 of second variator 3. On the other hand, central rectangular elongated hole 162h engages with a stationary portion 1c, which is fixedly connected to CVT casing 1. The front face of stationary portion 1c faces the front inner peripheral wall surface $162h_1$ of central rectangular elongated hole 162h, whereas the rear face of stationary portion 1c faces the rear inner peripheral wall surface $162h_1$ of central rectangular elongated hole 162h. In other words, the fore-and-aft movement of upper link 162 relative to CVT casing 1 can be greatly restricted by abutment between the front face of stationary portion 1c and the front inner peripheral wall surface $162h_1$, or by abutment between the rear face of stationary portion 1c and the rear inner peripheral wall surface $162h_1$. That is, in the fourth embodiment, stationary portion 1c of the engagement pair (1c, $162h_1$) is comprised of output gear housing 32 (exactly, either of the front and rear faces of output gear housing 32), while the engagement portion engaging with stationary portion 1c is comprised of the inner peripheral wall surface $162h_1$ of central rectangular elongated hole 162h (exactly, either of the front and rear inner peripheral wall surfaces $162h_1$, $162h_1$). In the upper link support structure of the fourth embodiment, output gear housing 32 (see FIG. 1) also serves as the stationary portion 1c, which is protruded from the inner periphery of CVT casing 1 toward the upper link. The use of output gear housing 32 as a stationary portion 1c eliminates the necessity of an additional stationary portion fixed to the CVT casing. In this manner, upper link 162 can be supported on CVT casing 1 in a state that the fore-and-aft movement of upper link 160 relative to CVT casing 1 is greatly restricted by contact or abutment between the stationary portion 1c fixed to CVT casing 1 and the inner periphery $162h_1$ of central rectangular elongated hole 162h. Therefore, in the same manner as the first embodiment, in the upper link support structure of the fourth embodiment, there is no risk that the previously-noted forces γ and δ having almost the same magnitude but different sense with respect to the circumferential direction of the input/output disk, occur, even in the presence of a change of the intersection angle. That is, even in the presence of a change of the intersection angle during ratio changing, it is possible to prevent torque distribution between the power rollers included in each variator (2, 3) from being unbalanced or deteriorated, thus eliminating the problem of undesired slip of the power roller arising from the deteriorated torque distribution. This contributes to a reduction in a design loading force for loading cam device 36, thus downsizing the toroidal CVT. Additionally, the existing output gear housing 32 usually employed in the toroidal CVT system is utilized as the stationary portion of the engagement pair (1c, $162h_1$), the upper link support structure of the fourth embodiment is simple in construction and advantageous with respect to reduced toroidal CVT component parts and time saved in installation. As set forth above, using output gear housing 32 integrally connected to part of CVT casing 1 located between two output disks 6 and 7 of first and second variators 2 and 3 set in tandem as stationary portion 1c, contributes to structural simplicity and reduced manufacturing costs. In comparison with the single comparatively large central rectangular hole $h_3$ of upper link 160 of the first embodiment shown in FIG. 3, in case of three-split elongated holes $h_3$, 162h, $h_3$ of upper link 162 of the fourth embodiment shown in FIG. 6, a pair of non-machined portions between the front elongated rectangular hole $h_3$ and central rectangular elongated hole 162h and between the rear elongated rectangular hole $h_3$ and central rectangular elongated hole 162h serve as reinforcements. Furthermore, the upper link support structure of the fourth embodiment never has square holes $h_2$, $h_2$ midway between a pair of trunnion support holes $h_1$, $h_1$. The upper link of the fourth embodiment having the non-machined reinforcement portions but not having square holes $h_2$, $h_2$ is advantageous with respect to enhanced mechanical strength and rigidity. Moreover, in the upper link support structure of the fourth embodiment of FIG. 6, a contact area between upper link 162 and stationary portion 1c (i.e., output gear housing 32) is comparatively large, thus effectively reducing a bearing stress at the abutment portion between the inner periphery 162 $h_1$ of central rectangular elongated hole 162h and stationary portion 1c.

Figure 7:
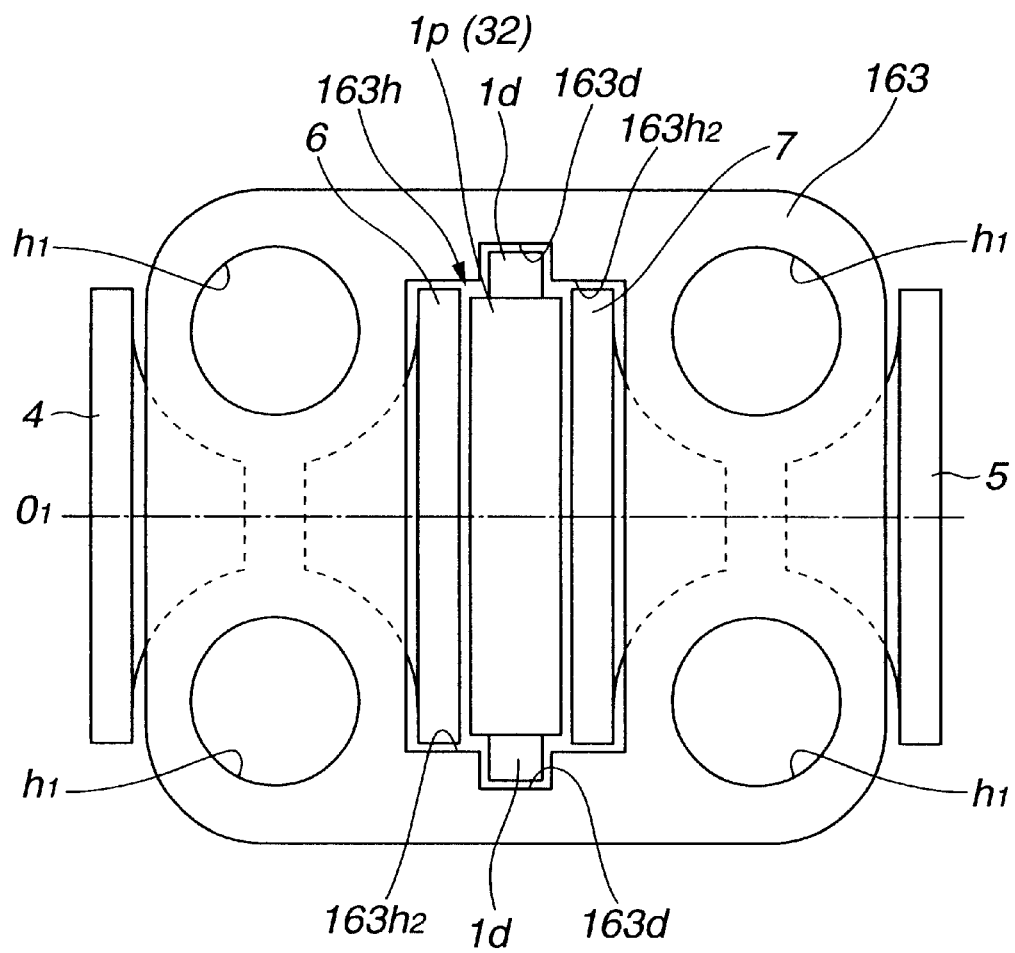
FIG. 7 is a top view showing the upper link support structure of a fifth embodiment.
Figure 8:
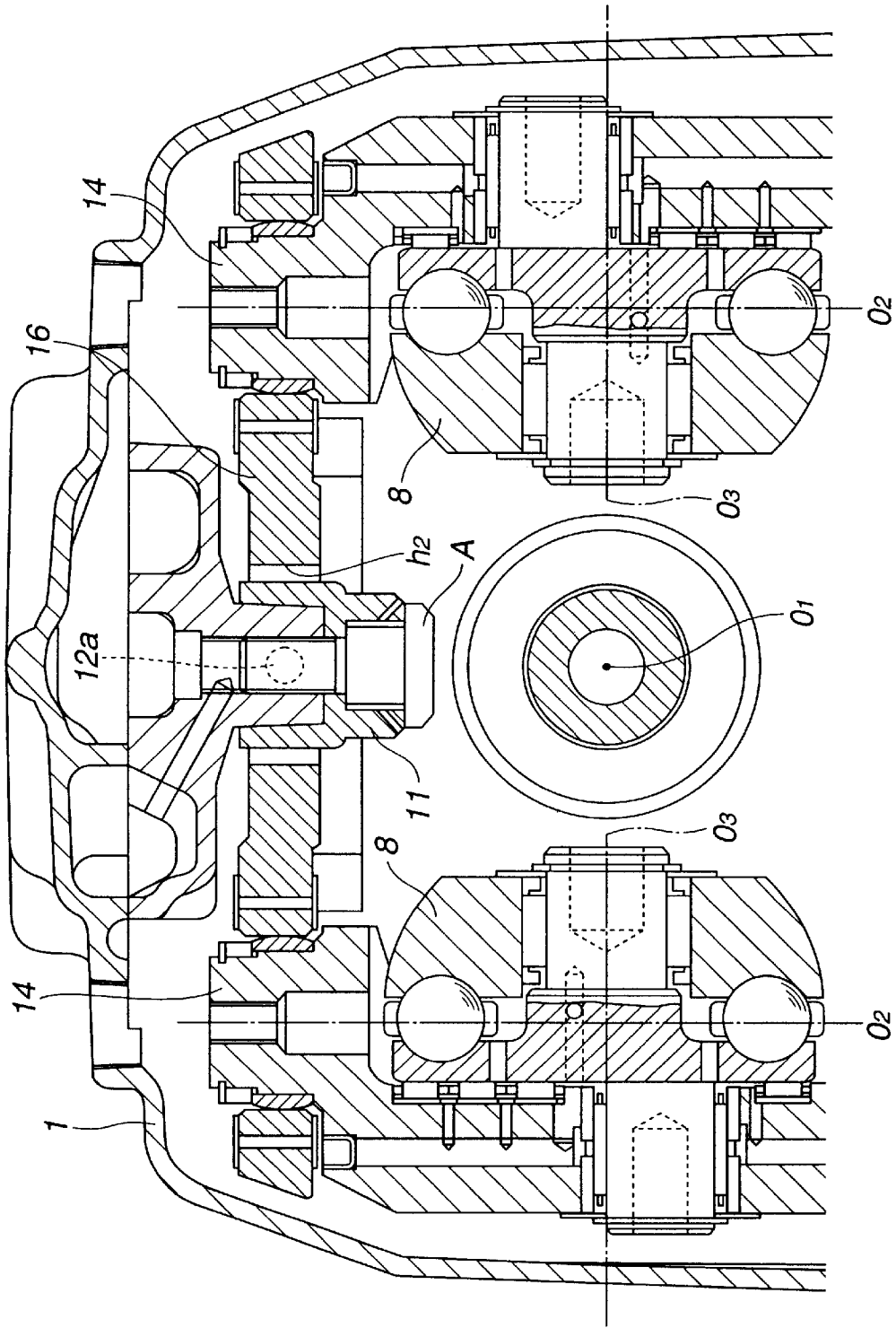
FIG. 8 is a partial cutaway view of the front side of a conventional double cavity type toroidal CVT.
Figure 9:
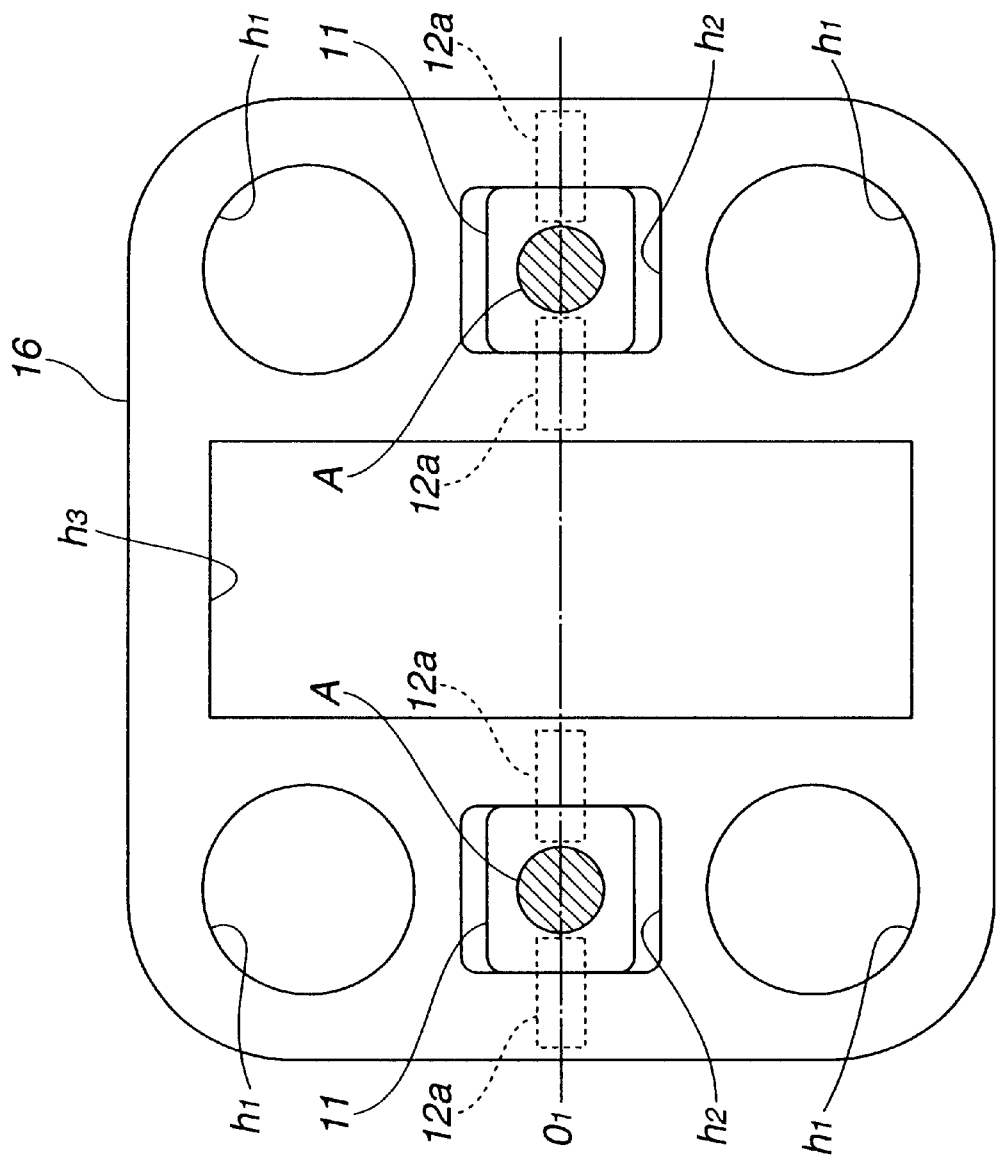
FIG. 9 is a top view showing the upper link support structure of the conventional double cavity type toroidal CVT shown in FIG. 8.
Figure 10A:
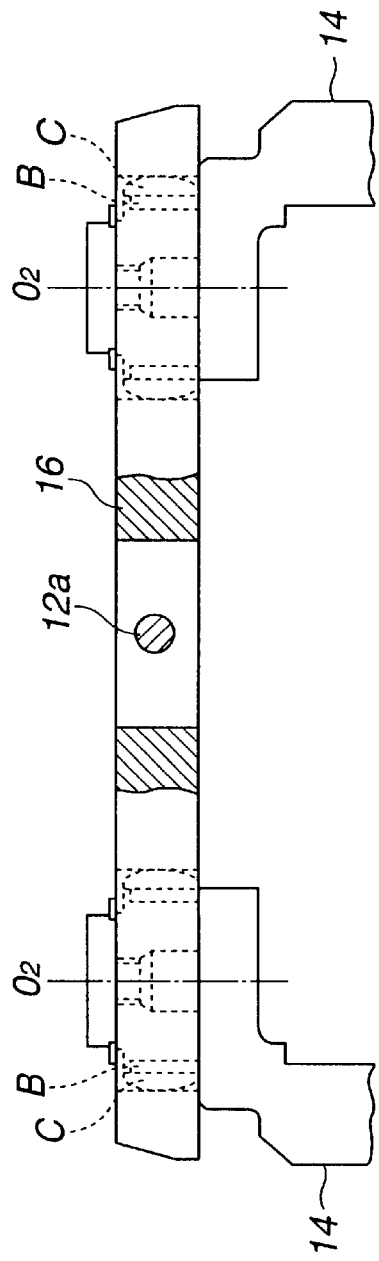
FIG. 10A is a side view of the upper link support structure of the conventional double cavity type toroidal CVT, viewed from the direction of common rotation axis $O_1$ of the input and output disks.
Figure 10B:
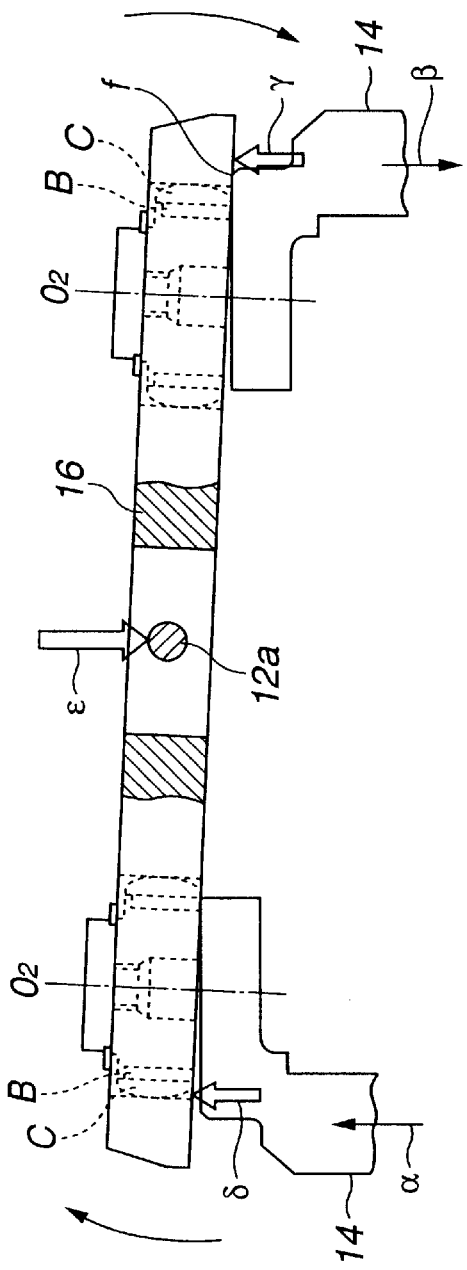
FIG. 10B is an explanatory drawing showing analytical mechanics for applied forces acting on the conventional link support structure related to FIGS. 8, 9, and 10A.

Referring now to FIG. 7, there is shown the upper link support structure of the fifth embodiment. For the purpose of comparison among the first and fifth embodiments, the same reference signs used to designate elements shown in the upper link support structure of the first embodiment (see FIG. 3) will be applied to the corresponding elements shown in the fifth embodiment (see FIG. 7). In the upper link support structure of the fifth embodiment, a comparatively large, single central substantially rectangular hole 163h is located substantially in a middle portion of the first and second variators and formed in an upper link 163, which mechanically links first and second variators 2 and 3 set in tandem and coaxially arranged with respect to common rotation axis $O_1$, so as to avoid the interference between the upper link and output disks 6 and 7 of first and second variators 2 and 3. Single central substantially rectangular hole 163*h* has a pair of recessed portions 163*d*, 163*d* formed on left and right inner peripheral wall surfaces 163$h_2$, 163$h_2$ thereof. Recessed portions 163*d*, 163*d* engage with a pair of stationary portions 1*d*, 1*d*, each of which is fixedly connected to CVT casing 1 and rectangular in lateral cross section. Stationary portions 1*d*, 1*d* are fixedly connected or attached to a protruded portion 1*p* that extends from the inner periphery of CVT casing 1 toward the upper link. Stationary portions 1*d*, 1*d* are arranged symmetrical with respect to common rotation axis $O_1$ and fitted to the respective recessed portions 163*d*, 163*d*. As seen in FIG. 7, in the fifth embodiment, stationary portion 1*d* of the engagement pair (1*d*, 163*d*) is formed as a protruded portion laterally outwardly extending from the outer periphery of output gear housing 32, while the engagement portion (engaging with stationary portion 1*d*) is formed as are ceased portion formed on the inner peripheral wall surfaces 163$h_2$ of upper link 163. In a similar manner to the first embodiment, the upper link support structure of the fifth embodiment utilizes a vertically sliding fit between stationary portion 1*d* and recessed portion 163*d* that permits the vertical movement of upper link 163 relative to CVT casing 1 and greatly restricts the fore-and-aft movement of upper link 163 relative to CVT casing 1. In the upper link support structure of the fifth embodiment, output gear housing 32 (the existing toroidal CVT component part) also serves as the protruded portion 1*p* that extends from the inner periphery of CVT casing 1 toward the upper link and has stationary portions 1*d*, 1*d* engaging the respective recessed portions 163*d*, 163*d*. As a matter of course, output gear housing 32 also serving as the protruded portion 1*p* eliminates the necessity of an additional protruded portion fixed to the CVT casing. In this manner, upper link 163 can be supported on CVT casing 1 in a state that the fore-and-aft movement of upper link 163 relative to CVT casing 1 is greatly restricted by fitting stationary portions 1*d*, 1*d* to the respective recessed portions 163*d*, 163*d* of single central substantially rectangular hole 163*h*. Therefore, in the upper link support structure of the fifth embodiment, there is no risk that the previously-noted forces γ and δ having almost the same magnitude but different sense with respect to the circumferential direction of the input/output disk, occur, even in the presence of a change of the intersection angle. That is, even in the presence of a change of the intersection angle during ratio changing, it is possible to prevent torque distribution between the power rollers included in each variator (2, 3) from being unbalanced or deteriorated, thus eliminating the problem of undesired slip of the power roller arising from the deteriorated torque distribution, and ensuring a reduced design loading force for loading cam device 36, and downsizing the toroidal CVT. Additionally, the existing output gear housing 32 employed in the toroidal CVT system is utilized as the protruded portion 1*p* to which stationary portion 1*d* of the engagement pair (1*d*, 163*d*) is attached, the upper link support structure of the fifth embodiment is simple in construction and advantageous with respect to reduced toroidal CVT component parts and time saved in installation. In the same manner as the first embodiment, the upper link of the fifth embodiment not having square holes $h_2$, $h_2$ is advantageous with respect to enhanced mechanical strength and rigidity. It is unnecessary to increase the thickness of upper link 163 to supply a lack in the upper-link mechanical strength and rigidity. By way of the symmetrical arrangement of the two engagement pairs (1*d*, 163*d*; 1*d*, 163*d*), a frictional force allotted to or a bearing stress occurring at one of the two engagement pairs owing to the relative motion of upper link 163 to CVT casing 1 can be effectively reduced. Due to the effectively reduced friction, the upper link support structure of the fifth embodiment permits a smooth pivotal motion of the upper end of each trunnion (14, 14, 15, 15) relative to upper link 163 and a smooth change in the intersection angle. This avoids torque allotment between a pair of power rollers included in each of first and second variators 2 and 3 from deteriorating owing to the applied force from the upper link to each trunnion (14, 14, 15, 15). In the fifth embodiment, each of the two engagement pairs (1*d*, 163*d*; 1*d*, 163*d*) is comprised of stationary portion 1*d* attached to outer gear housing 32 (protruded portion 1*p*) inwardly protruded from the inner wall of CVT casing 1 toward common rotation axis $O_1$ and recessed portion 163*d* formed on each of left and right inner peripheral wall surface 163$h_2$, 163$h_2$ of single central substantially rectangular hole 163*h* of upper link 163. In lieu thereof, stationary portion 1*d* of the engagement pair may be formed as a recessed portion formed on the outer periphery of outer gear housing 32 and the engagement portion (engaging with stationary portion 1*d*) may be formed as a transverse protruded portion inwardly extending from each of left and right inner peripheral wall surfaces 163$h_2$, 163$h_2$ of single central substantially rectangular hole 163*h* of upper link 163.

Suppose that the upper and lower link support structures are both constructed as the conventional pin-support structures. Owing to assembling errors, there is an increased tendency for the installation position of the upper-link support pin of the upper link post to be slightly misaligned with that of the lower-link support pin of the lower link post with respect to the direction of power-roller rotation axis $O_3$. Such a slight misalignment causes a slight difference between a thrust force acting on the left-hand side of the trunnion pair and a thrust force acting on the right-hand side of the trunnion pair. Due to the slight thrust difference, a one of the upper and lower links tends to shift relative to the other in the lateral direction (the left-and-right direction) normal to both the longitudinal direction along common rotation axis $O_1$ and the vertical direction along trunnion axis $O_2$. In contrast, in the first, second, third, fourth, and fifth embodiments, the upper support structure is designed to greatly restrict only the fore-and-aft movement of upper link (160; 161; 162; 163) relative to CVT casing 1 and to permit the left-and-right movement of the upper link relative to CVT casing 1 within limits and to permit the vertical movement of fore-and-aft movement of upper link 160 relative to CVT casing 1 within limits. In other words, a clearance of the engagement pair (1*a*, 160*a*; 1*b*, 161*ed*; 1*c*, 162$h_1$; 1*d*, 163*d*) measured in the longitudinal direction along common rotation axis $O_1$ is dimensioned to be relatively small. On the other hand, a predetermined clearance of the engagement pair measured in the vertical direction along trunnion axis $O_2$ and a predetermined clearance of the engagement pair measured in the lateral direction (the left-and-right direction) normal to both common rotation axis $O_1$ and trunnion axis $O_2$ are dimensioned to be larger than the clearance of the engagement pair measured in the fore-and-aft direction along common rotation axis $O_1$. That is, a freedom for the fore-and-aft movement of the upper link relative to the CVT casing is relatively less than a freedom for the vertical movement of the upper link relative to the CVT casing in a vertical direction along trunnion axis $O_2$ and relatively less than a freedom for the left-and-right movement of the upper link relative to the CVT casing in a left-and-right direction normal to both the common rotation axis $O_1$ and trunnion axis $O_2$. As set forth above, in the link support structure of the shown embodiment, the left-and-right movement of the upper link relative to CVT casing 1 is permitted by virtue of the relatively larger clearance. Thus, even in presence of the previously-noted slight thrust difference, the neutral axis of the upper link can be self-aligned with that of the lower link. For the reasons set out above, it is preferable to use the vertically-sliding-fit support structure that permits the vertical movement of the upper link relative to the CVT casing and greatly restricts the fore-and-aft movement of the upper link relative to the CVT casing for one of the upper and lower links. In the shown embodiment, the vertically-sliding-fit support structure is used for the upper link, while the conventional pin-support structure is used for the lower link. In order to enhance the freedom of the vertical direction (the direction along trunnion axis $O_2$), while restricting the relative movement of the lower link to the CVT casing in the fore-and-aft direction, regarding the lower link using the conventional pin-support structure, it is preferable to form the previously-described pin insertion hole 40*h* as a slotted hole (elongated in the vertical direction along trunnion axis $O_2$). Greatly restricting the fore-and-aft movement of the upper link relative to the CVT casing is essential to avoid the undesired interference between the upper link using the vertically-sliding-fit support structure and each of the input and output disks of first and second variators 2 and 3, when the input torque difference between the magnitude of torque transmitted to first variator 2 and the magnitude of torque transmitted to second variator 3 takes place during tilting motion of each of the power rollers, owing to input torque fluctuations and errors in installation.

As discussed above, in the shown embodiment, the vertically-sliding-fit support structure is used for the upper link, while the conventional pin-support structure is used for the lower link. Alternatively, in order to provide the same effects as the embodiments discussed above, the vertically-sliding-fit support structure may be used for the lower link, while the conventional pin-support structure may be used for the upper link. In case of the vertically-sliding-fit support structure of the embodiments, the link post or link support is not used. Usually, the link post is often formed with a lubricating-oil passage that supplies lubricating oil to the torus surfaces of the input and output disks in contact with the power rollers. Instead of the lubricating-oil passage formed in the link post, a lubricating oil passage may be formed in each trunnion. Although the toroidal CVT link support structure of the embodiment is exemplified in a double cavity type half-toroidal continuously variable transmission, it will be appreciated that the toroidal CVT link support structure of the embodiment may be applied to a single cavity type half-toroidal continuously variable transmission.

The entire contents of Japanese Patent Provisional Publication No. P2001-189506 (filed Jun. 22, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A toroidal continuously variable transmission comprising:
    input and output disks opposed to each other and coaxially arranged on a common rotation axis;
    a plurality of power rollers interposed between the input and output disks under axial preload for power transmission;
    a plurality of trunnions rotatably supporting the respective power rollers to permit a tilting motion of each of the power rollers about a trunnion axis perpendicular to a power-roller rotation axis for ratio changing;
    an upper link that mechanically links upper ends of the trunnions to each other;
    a lower link that mechanically links lower ends of the trunnions to each other;
    a transmission casing;
    a link support structure that supports one of the upper and lower links in the transmission casing; and
    the link support structure comprising:
        (i) a stationary portion fixed to an inner periphery of the transmission casing; and
        (ii) an engagement portion formed at the one link and in engagement with the stationary portion to provide an engagement pair, the engagement pair restricting a fore-and-aft movement of the one link relative to the transmission casing in a fore-and-aft direction along the common rotation axis, and a freedom for the fore-and-aft movement of the one link relative to the transmission casing being relatively less than a freedom for a vertical movement of the one link relative to the transmission casing in a vertical direction along the trunnion axis and relatively less than a freedom for a left-and-right movement of the one link relative to the transmission casing in a left-and-right direction normal to both the common rotation axis and the trunnion axis.

2. The toroidal continuously variable transmission as claimed in claim 1, wherein:
    the engagement portion of the engagement pair is formed on an outer periphery of the one link and in contact with the stationary portion to restrict the fore-and-aft movement of the one link relative to the transmission casing.

3. The toroidal continuously variable transmission as claimed in claim 2, wherein:
    the stationary portion comprises a protruded portion formed on at least one of left and right sides of the inner periphery of the transmission casing; and
    the engagement portion comprises a recessed portion formed on at least one of left and right sides of the one link and fitted to the protruded portion.

4. The toroidal continuously variable transmission as claimed in claim 2, wherein:
    the stationary portion comprises a recessed portion formed on at least one of left and right sides of the inner periphery of the transmission casing; and
    the engagement portion comprises a protruded portion formed on at least one of left and right sides of the one link and fitted to the recessed portion.

5. The toroidal continuously variable transmission as claimed in claim 1, wherein:
    the link support structure comprises two engagement pairs each comprising the stationary portion fixed to the inner periphery of the transmission casing and the engagement portion formed at the one link and in contact with the stationary portion; and the two engagement pairs are symmetrical with respect to the common rotation axis of the input and output disks.

6. The toroidal continuously variable transmission as claimed in claim 1, wherein:

the link support structure comprises two engagement pairs each comprising the stationary portion fixed to the inner periphery of the transmission casing and the engagement portion formed at the one link and in contact with the stationary portion; and the two engagement pairs are point-symmetrical with respect to a center of the one link and arranged diagonally with respect to the common rotation axis.

7. The toroidal continuously variable transmission as claimed in claim 6, wherein:

the engagement portion of a first engagement pair of the two engagement pairs comprises a front end wall of the one link, and the engagement portion of a second engagement pair of the two engagement pairs comprises a rear end wall of the one link; and the stationary portion of the first engagement pair is in contact with the front end wall and the stationary portion of the second engagement pair is in contact with the rear end wall.

8. A double-cavity type toroidal continuously variable transmission with two variators opposed to each other and set in tandem and coaxially arranged in an interior space of a transmission casing, each variator comprising:

input and output disks opposed to each other and coaxially arranged on a common rotation axis;

a plurality of power rollers interposed between the input and output disks under axial preload for power transmission;

a plurality of trunnions rotatably supporting the respective power rollers to permit a tilting motion of each of the power rollers about a trunnion axis perpendicular to a power-roller rotation axis for ratio changing;

an upper link that mechanically links upper ends of the trunnions to each other;

a lower link that mechanically links lower ends of the trunnions to each other;

a link support structure that supports one of the upper and lower links in the transmission casing; and the link support structure comprising:

(i) a stationary portion fixed to an inner periphery of the transmission casing; and (ii) an engagement portion formed at the one link and in engagement with the stationary portion to provide an engagement pair, the engagement pair restricting a fore-and-aft movement of the one link relative to the transmission casing in a fore-and-aft direction along the common rotation axis, and a freedom for the fore-and-aft movement of the one link relative to the transmission casing being relatively less than a freedom for a vertical movement of the one link relative to the transmission casing in a vertical direction along the trunnion axis and relatively less than a freedom for a left-and-right movement of the one link relative to the transmission casing in a left-and-right direction normal to both the common rotation axis and the trunnion axis.

9. The double-cavity type toroidal continuously variable transmission as claimed in claim 8, wherein:

the engagement portion of the engagement pair is formed on an outer periphery of the one link and in contact with the stationary portion to restrict the fore-and-aft movement of the one link relative to the transmission casing.

10. The double-cavity type toroidal continuously variable transmission as claimed in claim 9, wherein:

the stationary portion comprises at least one protruded portion formed on the inner periphery of the transmission casing; and the engagement portion comprises a recessed portion formed on at least one of left and right sides of the one link and fitted to the protruded portion.

11. The double-cavity type toroidal continuously variable transmission as claimed in claim 9, wherein:

the stationary portion comprises at least one recessed portion formed on the inner periphery of the transmission casing; and the engagement portion comprises a protruded portion formed on at least one of left and right sides of the one link and fitted to the recessed portion.

12. The double-cavity type toroidal continuously variable transmission as claimed in claim 8, wherein:

the link support structure comprises two engagement pairs each comprising the stationary portion fixed to the inner periphery of the transmission casing and the engagement portion formed at the one link and in contact with the stationary portion; and the two engagement pairs are symmetrical with respect to the common rotation axis of the input and output disks.

13. The double-cavity type toroidal continuously variable transmission as claimed in claim 8, wherein:

the link support structure comprises two engagement pairs each comprising the stationary portion fixed to the inner periphery of the transmission casing and the engagement portion formed at the one link and in contact with the stationary portion; and the two engagement pairs are point-symmetrical with respect to a center of the one link and arranged diagonally with respect to the common rotation axis.

14. The double-cavity type toroidal continuously variable transmission as claimed in claim 13, wherein:

the engagement portion of a first engagement pair of the two engagement pairs comprises a front end wall of the one link, and the engagement portion of a second engagement pair of the two engagement pairs comprises a rear end wall of the one link; and the stationary portion of the first engagement pair is in contact with the front end wall and the stationary portion of the second engagement pair is in contact with the rear end wall.

15. The toroidal continuously variable transmission as claimed in claim 1, further comprising:

a low-friction member provided on a contact surface between the one link and the stationary portion to reduce friction between the one link and the stationary portion.

16. A double-cavity type toroidal continuously variable transmission with two variators opposed to each other and set in tandem and coaxially arranged in an interior space of a transmission casing, each variator comprising:

input and output disks opposed to each other and coaxially arranged on a common rotation axis;

a plurality of power roller interposed between the input and output disks under axial preload for power transmission;

a plurality of trunnions rotatably supporting the respective power rollers to permit a tilting motion of each of the power rollers about a trunnion axis perpendicular to a power-roller rotation axis for ratio changing;

an upper link that mechanically links upper ends of the trunnions to each other;

a lower link that mechanically links lower ends of the trunnions to each other;

a link support structure that supports one of the upper and lower links in the transmission casing; and the link support structure comprising:
- (i) a stationary portion fixed to an inner periphery of the transmission casing; and
- (ii) an engagement portion including a central hole, which is formed in the one link and located substantially in a middle portion of the first and second variators, an inner periphery of the central hole being in engagement with the stationary portion to provide an engagement pair, the engagement pair restricting a fore-and-aft movement of the one link relative to the transmission casing in a fore-and-aft direction along the common rotation axis, and a freedom for the fore-and-aft movement of the one link relative to the transmission casing being relatively less than a freedom for a vertical movement of the one link relative to the transmission casing in a vertical direction along the trunnion axis and relatively less than a freedom for a left-and-right movement of the one link relative to the transmission casing in a left-and-right direction normal to both the common rotation axis and the trunnion axis.

17. The double-cavity type toroidal continuous variable transmission as claimed in claim 16, wherein:

the link support structure comprises two engagement pairs each comprising the stationary portion fixed to the inner periphery of the transmission casing and the engagement portion formed on the inner periphery of the central hole of the one link and in contact with the stationary portion; and the two engagement pairs are symmetrical with respect to the common rotation axis of the input and output disks.

18. The double-cavity type toroidal continuously variable transmission as claimed in claim 17, wherein:

the engagement portion of a first engagement pair of the two engagement pairs comprises a front inner peripheral wall surface of the central hole of the one link, and the engagement portion of a second engagement pair of the two engagement pairs comprises a rear inner peripheral wall surface of the central hole of the one link; and the stationary portion of the first engagement pair is in contact with the front inner peripheral wall surface and the stationary portion of the second engagement pair is in contact with the rear inner peripheral wall surface.

19. The double-cavity type toroidal continuously variable transmission as claimed in claim 16, wherein:

the stationary portion comprises a protruded portion formed on at least one of left and right sides of an output gear housing fixed connected to the inner periphery of the transmission casing; and the engagement portion comprises a recessed portion formed on at least one of left and right inner peripheral wall surfaces of the one link and fitted to the protruded portion.

20. The double-cavity type toroidal continuously variable transmission as claimed in claim 16, wherein:

the stationary portion comprises a recessed portion formed on at least one of left and right sides of an output gear housing fixedly connected to the inner periphery of the transmission casing; and the engagement portion comprises a protruded portion formed on at least one of left and right inner peripheral wall surfaces of the one link and fitted to the recessed portion.

* * * * *